(12) United States Patent
Bulawa et al.

(10) Patent No.: US 10,535,098 B2
(45) Date of Patent: *Jan. 14, 2020

(54) RECURRING MONEY TRANSFER

(71) Applicant: The Western Union Company, Englewood, CO (US)

(72) Inventors: Kurt Bulawa, Parker, CO (US); Michele Demark, Highlands Ranch, CO (US); Michael Michelsen, Arvada, CO (US); Dave Owen, Castle Rock, CO (US)

(73) Assignee: The Western Union Company, Denver, CO (US)

( * ) Notice: Subject to any disclaimer, the term of this patent is extended or adjusted under 35 U.S.C. 154(b) by 25 days.

This patent is subject to a terminal disclaimer.

(21) Appl. No.: 14/188,100

(22) Filed: Feb. 24, 2014

(65) Prior Publication Data

US 2014/0316977 A1 Oct. 23, 2014

Related U.S. Application Data

(63) Continuation of application No. 12/848,709, filed on Aug. 2, 2010, now Pat. No. 8,660,923.

(51) Int. Cl.
*G06Q 40/00* (2012.01)
*G06Q 20/10* (2012.01)
*G06Q 40/02* (2012.01)

(52) U.S. Cl.
CPC ............. *G06Q 40/00* (2013.01); *G06Q 20/10* (2013.01); *G06Q 20/102* (2013.01); *G06Q 40/02* (2013.01); *G06Q 40/025* (2013.01)

(58) Field of Classification Search
CPC ........... G06Q 40/00; G06Q 40/02; G07G 1/14
USPC .............................................. 705/35, 38, 39
See application file for complete search history.

(56) References Cited

U.S. PATENT DOCUMENTS

| 8,234,215 B2 | 7/2012 | Keiser et al. |
| 2007/0203829 A1* | 8/2007 | Polanco ................. G06Q 20/10 705/39 |
| 2008/0097905 A1 | 4/2008 | Neofytides et al. |
| 2008/0257952 A1 | 10/2008 | Zandonadi |
| 2008/0281726 A1 | 11/2008 | Gupta |

* cited by examiner

*Primary Examiner* — Scott S Trotter
(74) *Attorney, Agent, or Firm* — Kilpatrick Townsend & Stockton, LLP

(57) ABSTRACT

A system and method of performing a value-advance money transfer comprising: receiving a money transfer request; determining whether an account associated with a sender of funds includes a sufficient amount of funds to cover a money transfer request; providing an amount of funds from a money transfer provider to the account associated with the sender to cover the money transfer request; making the amount of funds available to the sender for use in the money transfer; and executing a money transfer from the account to the control of the receiver.

21 Claims, 14 Drawing Sheets

RECURRING MONEY TRANSFER

CROSS-REFERENCES TO RELATED APPLICATIONS

This application is a continuation of U.S. patent application Ser. No. 12/848,709, filed Aug. 2, 2010, and entitled, "RECURRING MONEY TRANSFER," issued as U.S. Pat. No. 8,660,923, the entire disclosure of which is hereby incorporated by reference, for all purposes, as if fully set forth herein.

BACKGROUND OF THE INVENTION

Individuals may engage in money transfers for various purposes, such as paying bills, helping family or friends, etc. These money transfers may be made on a regular basis, such as monthly money transfers to family members to help pay bills. On occasion, an individual that regularly engages in money transfers may not be able to fund a particular money transfer, but may be able fund the money transfer at a later point in time. On the receiving end, some individuals may rely on money transfers to pay bills and/or to provide for other necessities. A money transfer that cannot be completed due to insufficient funds may result in one or more bills not being paid and/or other necessities not being met. In addition, missed bill payments may result in late charges and/or fees being applied to the bill, which may increase the difficulty of paying the bill.

In addition, making repeated money transfers often requires the sender to visit a money transfer provider's location, either physically or remotely, in order to initiate the money transfer. Due to time and/or geographical constraints, regularly visiting a money transfer provider's location may place a significant burden on the sender.

BRIEF SUMMARY OF THE INVENTION

Embodiments of the present invention relate to systems and methods that allow a sender to transfer money without providing funds for the money transfer upfront (i.e., at the time of the money transfer). According to one embodiment, a method of performing a money transfer may occur at a money transfer provider and may include determining that a sender is eligible to participate in a value-advance money transfer program based on the evaluation of one or more conditions. The one or more conditions may include: a registration request from the sender to participate in the value-advance money transfer program, a history of money transfer using the money transfer provider, a payment of one or more fees, a credit score, a loyalty member status, etc.

In addition, determining that the sender is eligible may include establishing one or more criterion to judge the sender's history of money transfers, applying the one or more criterion to the sender, and evaluating the money transfer history of the sender. The value-advance money transfer program may allow the sender to make a money transfer regardless of if the sender provides funds for the money transfer.

The method may also include registering the sender in the value-advance money transfer program and may include creating an account associated with the sender (i.e., sender's account). The method may further include receiving a money transfer request to provide a first amount of funds for a receiver and may additionally include determining whether the sender's account includes a sufficient amount of funds to cover the transfer request. If the account includes an insufficient amount of funds, the method may additionally include providing a second amount of funds from the money transfer provider to the sender's account to cover the money transfer request. The method may additionally include making the second amount of funds available to the sender for use in the money transfer and may include executing a money transfer from the sender's account to the control of the receiver.

In addition, the method of performing a money transfer may further include receiving at least one payment of funds from the sender that partially covers the money transfer amount and associating the payment of funds with the sender's account. A portion of the payment may be withheld by the money transfer provider in exchange for assurance that the second amount of funds will be provided to the sender's account when a future money transfer is insufficiently funded.

Further, the method of performing a money transfer may include providing an identifier to the sender and, subsequent to providing the identifier, receiving information associated with the identifier from the sender. The identifier may be configured to limit an eligible pool of receivers to a predetermined group selected by the sender and/or provide the sender with access to the value-advance money transfer program. The identifier may be associated with a plurality of receivers so that when the identifier is used (i.e., identifier information is received by the money transfer provider), the money transfer is limited to the plurality of receivers.

The value-advance money transfer program may be an upgrade to the sender's pre-existing money transfer loyalty card program. Receiving the transfer request may include receiving a money transfer schedule from the sender that defines a plurality of money transfers to be made over a specified period of time. When the transfer request include a money transfer schedule, the step of determining whether the account includes a sufficient amount of funds may be performed for each of the plurality of money transfers so that the second amount of funds may be provided to the sender's account when any of the plurality of money transfers are insufficiently funded.

The method of performing a money transfer may additionally include establishing a money transfer schedule that defines a plurality of money transfers to be made over a specified period of time, providing terms for the money transfer schedule to the sender, and receiving an acceptance from the sender as to the terms of the money transfer schedule. The terms for the money transfer schedule may provide that a fee, an interest rate, and/or an exchange rate used during the specified time will not change. In addition, the money transfer schedule may further define a plurality of payments to be made by the sender over the specified period of time so that by the end of the specified period of time, the sender provides some or all of the funds required for the plurality of money transfers. Similarly, the step of determining whether the account includes a sufficient amount of funds may be performed for each of the plurality of money transfers to determine if the sender's account is sufficiently funded from one or more of the plurality of payments and, therefore, whether the second amount of funds needs to be provided for any of the plurality of money transfers. Alternatively or additionally, the execution of the money transfer may be conditioned on the receiver complying with one or more rules provided by the sender.

In one embodiment of the method, the money transfer request may be received from the receiver and the second amount of funds may be provided based on the money transfer request from the receiver (i.e., instead of or in addition to being based on a request from the sender). Additionally, the money transfer request from the receiver may be a first money transfer request and the sender associated with the first money transfer request may be a first sender. The method may further include receiving a second money transfer request from the receiver that identifies a second sender. Based on the second money transfer request, a third amount of funds may be provided from the money transfer provider to an account that is associated with the second sender. The third amount of funds may be used to repay the first sender at least a portion of the amount of funds used in the money transfer between the first sender and the receiver (i.e., the receiver may direct that funds be provided to a second sender and/or that the funds of the second sender be used to repay the first sender). The receiver may be allowed to request the money transfer based on a history of money transfers between the sender and the receiver.

Alternatively or additionally, the sender can be repaid at least a portion of the money transfer amount directly from an account associate with the receiver (i.e., the receiver's account). For example, a method of repaying the sender may include associating an account with the receiver (receiver's account) and removing an amount of funds from the receiver's account. The amount of funds removed from the receiver's account may include at least a portion of the money transfer amount. The method may further include providing the amount of funds from the receiver's account to the sender's account to repay the sender for at least a portion of the money transfer amount.

The money transfer request from the receiver may be conditioned on one or more rules provided by the sender (e.g., the sender may provide one or more rules before the receiver's request is received that limit the receiver's request). The one or more rules may direct or instruct the money transfer provider on how to repay the sender. For example, the rules may direct the money transfer provider to provide a third amount of funds to the sender's account from an account of another sender that is associated with the receiver and/or from the receiver's account to repay the sender at least a portion of the money transfer amount.

According to another embodiment of the present invention, a method of performing a money transfer may include receiving a money transfer schedule from the sender that defines a plurality of money transfers to be made over a specified period of time to at least one receiver. The method may also include receiving at least one payment of funds from the sender and associating the payment of funds with the sender's account. The method may further include determining whether to perform one of the plurality of money transfers based on the money transfer schedule. The method may additionally include executing a money transfer to transfer at least a portion of the funds from the account to the receiver. The money transfer provider may make each of the plurality of money transfers according to the money transfer schedule regardless of if the account is funded prior to each money transfer.

The method may additionally include providing a plurality of transfer numbers to the sender where each of the plurality of transfer numbers correspond with one or more of the plurality of money transfers. Receipt of any one of the plurality of transfer numbers at the money transfer provider may indicate that funds are to be transferred from the sender's account (i.e., receipt of one of the transfer numbers may trigger a money transfer corresponding to that transfer number; the money transfer may have pre-designated transfer amounts and receiver information). The method may additionally include receiving one or more of the plurality of transfer numbers at the money transfer provider. Upon receipt of any one of the transfer numbers, a predetermined amount of funds may be transferred from the account to one or more predetermined receivers.

In some embodiments the sender may make one or more payments to fund one or more of the plurality of money transfers. The value of one or more payments may exceed the value of a corresponding money transfer or transfers (i.e., the sender may provide more funds than are required for the next money transfer or next several transfers). The excess funds may be kept in the sender's account so that the funds can be used in a future underfunded money transfer. The excess funds may continue to accumulate in the sender's account. In some embodiment, the sender may make a single payment of funds that covers all of the plurality of money transfer over the specified period of time. In such an embodiment, the money transfer schedule may define one or more portions of the payment of funds to apply to each of the plurality of money transfers. And the money transfer provider may apply a portion or portions of the payment of funds to each of the plurality of money transfers in accordance with the money transfer schedule.

According to another embodiment, the present invention may include a method of funding a receiver associated with a recurring money transfer. The method may include receiving a request at a money transfer provider from the receiver to provide a first amount of funds for the receiver. The method may also include providing the first amount of funds to the receiver from the money transfer provider. The first amount of funds may be provided based on a history of money transfers between the receiver and a sender. The method may further include receiving an instruction at the money transfer provider from the receiver to withhold at least a portion of a second amount of funds provided by the sender in a money transfer between the sender and the receiver, where the second amount of funds may be used to repay the first amount of funds provided by the money transfer provider.

The method of funding a receiver may additionally include receiving the second amount of funds from the sender, withholding the specified portion of the second amount of funds in accordance with the instruction from the receiver, and applying the withheld portion of the second amount of funds toward repaying the first amount of funds. In addition, the method of funding a receiver may additionally include receiving an additional instruction from the receiver to withhold a portion of a third amount of funds provided by an additional sender (i.e., generally not the same sender) in a money transfer between the additional sender and the receiver, where the portion of the third amount of funds is combined with the portion of the second amount of funds to repay some or all of the first amount of funds provided by the money transfer provider. Likewise, the instruction and/or the additional instruction may direct the money transfer provider to withhold a certain amount of funds from each of a plurality of future money transfers until the first amount of funds has been fully repaid.

According to another embodiment, the present invention may include a method of providing a credit indicator based on one or more money transfer patterns. The method may include receiving a money transfer schedule from a sender that defines a plurality of money transfers to be made over a specified period of time. The method may also include receiving funds from the sender over the specified period of time to fund the plurality of money transfers. The method may further include evaluating the performance of the sender in providing funds for the money transfers according to the money transfer schedule and determining a credit indicator based on the evaluation.

The money transfer schedule may further define a payment schedule that indicates when the funds are to be received from the sender (i.e., provides one or more dates that the funds are to be received by). Additionally, the evaluation may include evaluating when the funds are received from the sender against the payment schedule. The method may additionally include providing credit to the sender based on the credit indicator.

The method may additionally include providing funds to an account associated with the sender when any one of the plurality of money transfers is insufficiently funded, evaluating the repayment of the provided funds by the sender, and determining a credit indicator based on the repayment of the provided funds in addition to the performance of the sender in providing money for the money transfers.

The method may additionally include providing the credit indicator to one or more entities (e.g., a bank, credit bureau, etc.). The credit indicator may be provided to one or more entities to establish credit or trust between the entity and the sender, for marketing purposes, and/or for cross selling other products and/or services. In addition, the money transfer schedule may be based on paying one or more bills.

DETAILED DESCRIPTION OF THE INVENTION

Figure 1:
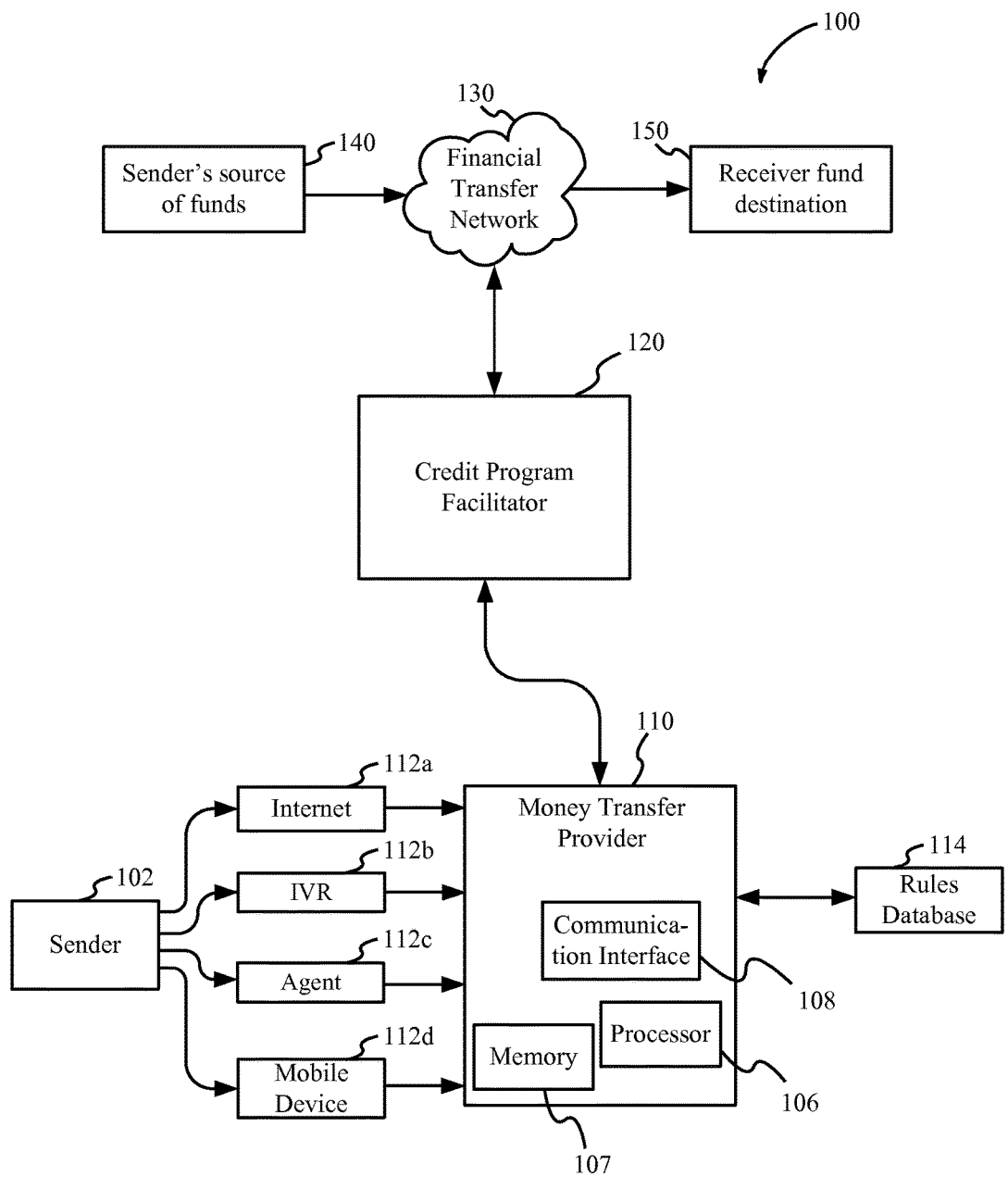
FIG. 1 is a block diagram illustrating a system for performing value-advance money transfers according to embodiments of the present invention.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Embodiments of the present invention relate to systems and methods that allow a sender to transfer money without providing funds upfront (or at the time of the money transfer). For example, individuals often transfer money for various purposes, such as paying bills, helping family and/or friends, etc. Sometimes individuals make money transfers on a regular basis, such as transferring money to family on a monthly or bi-monthly basis. In addition, some individuals that regularly make money transfers may not receive funds on a predictable basis. For example, contract employees may receive compensation only upon meeting project milestones or goals instead of receiving compensation on a weekly or bi-monthly basis. Sometimes the combination of receiving compensation on a unpredictable schedule while regularly making money transfers will result in the sender not having sufficient capital to fund for one or more money transfers, although the sender may be capable of funding the money transfer at a later point in time.

Furthermore, making repeated money transfers often requires the sender to visit a money transfer provider's location, either physically or remotely, in order to initiate the money transfer. Due to time and/or geographical constraints, regularly visiting a money transfer provider's location may place a significant burden on the sender (e.g., due to work and/or travel, a sender may not be able to visit a physical location of a money transfer provider or may not have access to services that allow the sender to remotely access a money transfer provider's website).

On the receiving end, some individuals may rely on money transfers to pay bills and/or to provide for other necessities. For example, in some situations a family member may transfer money to a spouse or parents to pay bills and/or pay for other necessities (e.g., food, clothing, etc.). A money transfer that cannot be completed due to insufficient funds may result in one or more bills not being paid and/or other necessities not being provided for. Missing bill payments may result in the addition of late charges and/or other fees, which may increase the difficulty of paying the bill for the receiver and/or sender. Senders may be hesitant about borrowing money in order to fund a money transfer due to time constraints, excessive fees, and/or excessive interest rates, lack of collateral, etc.

In some embodiments of the present invention, to minimize or eliminate the impact of insufficiently funded money transfers, a money transfer provider may provide one or more services to senders and/or receivers that allow for the money transfer provider to occasionally advance funds to a sender and/or receiver to cover an insufficiently funded money transfer. In one embodiment, the service may require the sender and/or receiver to pay back the advanced funds. In other embodiments, the money transfer provider may charge one or more fees to allow a future insufficiently funded money transfer to be covered up to a certain amount without requiring the sender to payback the advanced funds. In still other embodiments, the sender may provide funds in excess of what is required to fund one or more money transfers; the excess may be kept in an account associated with the sender to help fund an insufficiently funded money transfer in the future.

In some instances, a sender and/or receiver may use the same money transfer provider to regularly make money transfers. Similarly, the sender may regularly transfer money to the same receiver or to the same group of receivers. In such instances, based on regular and repeated business, the money transfer provider may develop confidence or trust in a sender's ability to fund money transfers and/or may develop confidence and/or trust in the receiver. The money transfer provider may offer the value-advance money transfer program to a sender and/or receiver based on this level of developed trust or confidence. In other embodiments, the money transfer provider may use one or more conditions to determine whether the money transfer provider has confidence or trust in the sender and/or receiver in order to offer the value-advance money transfer program to the sender and/or receiver.

Similarly, in some embodiments, to minimize the necessity of visiting a money transfer provider's location, either physically or remotely, the money transfer provider may permit the sender to pay funds up front for a plurality of future money transfers. The money transfer provider may provide the sender with one or more identifiers (e.g., transfer numbers) that each correspond with a particular one of the plurality of money transfers so that upon providing any one of the identifiers to the money transfer provider, a value-advance money transfer is initiated. In some embodiments, the sender may provide a money transfer schedule to the money transfer provider that defines how and when each, or at least some, of the plurality of money transfers is to be made. In this manner, the money transfer provider may initiate a money transfer without requiring the sender to visit the money transfer provider's location. Some of the features of the present invention have thus been described. In connection with the description of the figures below, many other features of the invention will be realized.

Attention is now directed to FIG. 1, which illustrates a system 100 for performing value-advance money transfers from a sender 102 to a receiver such as by transferring funds from a sender's source of funds 140 to a receiver fund destination 150. A value-advance money transfer may be any money transfer where the funds for the money transfer are provided by an entity and/or individual other than the sender. The receiver fund destination may include a variety of physical destinations for the funds, such as a bank account, a credit card account, a prepaid value account, general spend type accounts (e.g., PayPal® or Amazon® account), etc., or may include providing the funds directly to the receiver in tangible form, such as a check, cash, air miles, gift certificate, etc. The system may comprise a money transfer provider 110, which may be any entity that performs and/or provides money transfer services such as, for example, Western Union.

The money transfer provider 110 may be communicatively coupled with a credit program facilitator 120. The credit program facilitator may be any entity that deals with and/or handles money and/or credit, such as a bank, a credit card provider, a credit union, etc. In some embodiments, the credit program facilitator 120 may be the same entity as the money transfer provider 110. In embodiments where the credit program facilitator 120 is an entity other than the money transfer provider 110, the credit program facilitator 120 may provide the funds that are advanced to the sender or receiver, while the money transfer provider 110 provides the infrastructure (e.g., devices, software, transfer locations, agents, etc.) to handle and perform the value-advance money transfer. For example, in some embodiments, while the money transfer provider 110 provides the infrastructure to perform a value-advance money transfer, the credit program facilitator 120 provides one or more accounts upon which the money transfer provider may draw funds to advance in the value-advance money transfer process. Similarly, the credit program facilitator 120 may establish and/or maintain one or more accounts associated with either or both of the sender 102 and the receiver (not shown).

Similarly, the money transfer provider 110 may be communicatively coupled with one or more communication devices to communicate with the sender 102. The one or more communication devices may include the Internet 112a, an interactive voice response device (IVR) 112b, an agent 112c of the money transfer provider 110, a mobile device 112d, etc., through which one or more inputs may be provided from the sender 102 to the money transfer provider 110, and through which one or more outputs may be provided from the money transfer provider 110 to the sender 102. For example, through one of the communication devices, such as the Internet 112a, the sender 102 can provide instructions and/or information to the money transfer provider 110 and receive instructions and/or information from the money transfer provider 110. For example, the sender 102 may register for a value-advance money transfer program offered by the money transfer provider 110 by communicating through one of the communication devices (e.g., an agent 112c of the money transfer provider) and providing any necessary information via the communication device. Additionally, after registering in a value-advance money transfer program, the sender 102 may perform one or more value-advance money transfers by requesting, via the communication device (e.g., the Internet 112a), that the value-advance money transfer be performed.

The money transfer provider 110 may include and/or otherwise utilize one or more hardware and/or software components and/or applications (e.g., server, computer, etc.) to perform the functions and/or processes of the value-advance money transfer. The hardware and/or software may include one or more communication interfaces 108 configured to facilitate communication between the money transfer provider 110 and any other person and/or entity such as the sender 102 and the credit program facilitator 120. The hardware and/or software may also include one or more processors 106 configured to process and/or execute a variety of instructions and/or program codes to perform the value-advance money transfer. The instructions and/or program code can be embodied on one or more memory devices 107 as described with reference to FIG. 6 below (e.g ROM, RAM, etc.). Although the memory device 107 and processor 106 are shown in FIG. 1 as being internal to the money transfer provider 110, the memory device 107 and/or processor 106 may also by external to the money transfer provider 110 such as by residing on one or more computers that are communicatively coupled to the money transfer provider 110. In addition, the memory device 107 and processor 106 may be located at the credit program facilitator 120.

The money transfer provider 110 may also be communicatively coupled to a rules database 114 that includes one or more rules that facilitate in directing or controlling the value-advance money transfer. The one or more rules may be provided by the sender 102, the receiver (not shown), and/or the money transfer provider 110. In addition, the rules database may be internal to the money transfer provider 110 or external to the money transfer provider 110 as shown in FIG. 1.

In some embodiments, the credit program facilitator 120 may be communicatively coupled to a financial transfer network 130 to facilitate a transfer of funds from the sender's source of funds 140 to the receiver fund destination 150 as previously described. In other embodiments, the money transfer provider 110 may be communicatively coupled to the financial transfer network 130 to facilitate the transfer of funds.

Figure 2:
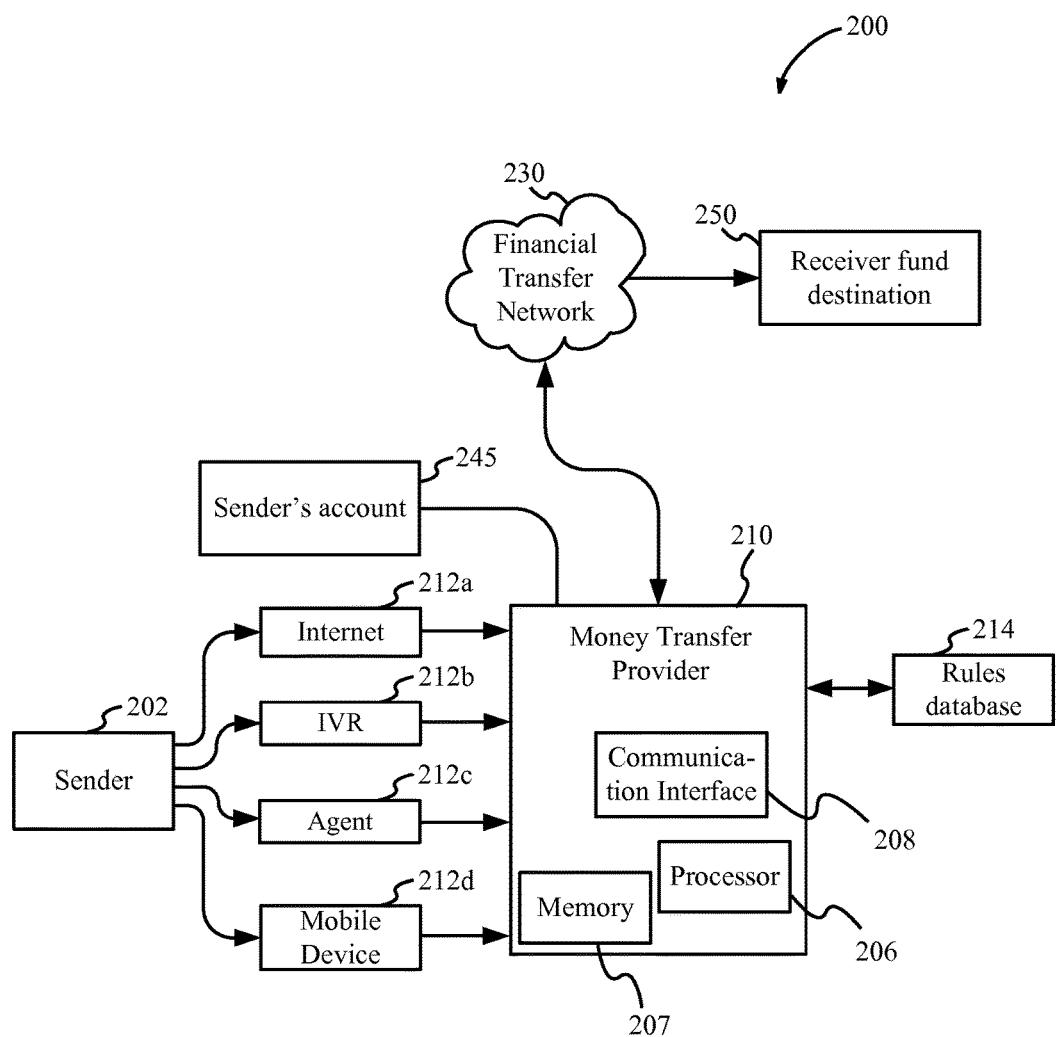
FIG. 2 is another block diagram illustrating a system for performing value-advance money transfers according to embodiments of the present invention.

FIG. 2 illustrates another system 200 for performing a value-advance money transfer. System 200 is similar to system 100 in that it includes a money transfer provider 210 that communicates with a sender 202 and/or receiver (not shown) to transfer money to the receiver. Money transfer provider 210 may utilize a processor 206, memory 207, communication interface 208, and rules database 214 as previously described.

The system 200 shows the money transfer provider 210 being communicatively coupled with a financial transfer network 230 without being communicatively coupled with the credit program facilitator 120. In system 200, the credit program facilitator 120 may be the same entity as the money transfer provider 210. Similarly, the sender 202 may have an account 245 that is established and/or maintained by the money transfer provider 210 so that funds provided by the sender 202 and/or advanced by the money transfer provider 210 for the sender may be maintained in the account 245.

The money transfer provider 210 may be communicatively coupled to the financial transfer network 230 to facilitate the transfer of funds from the sender's account 245 to the receiver fund destination 250 as previously described. Although the receiver fund destination 250 is shown as being maintained by an entity other than the money transfer provider 210, the receiver fund destination 250 may also be maintained by the money transfer provider 210 similar to the sender's account 245 as described with reference to FIG. 5.

Figure 3:
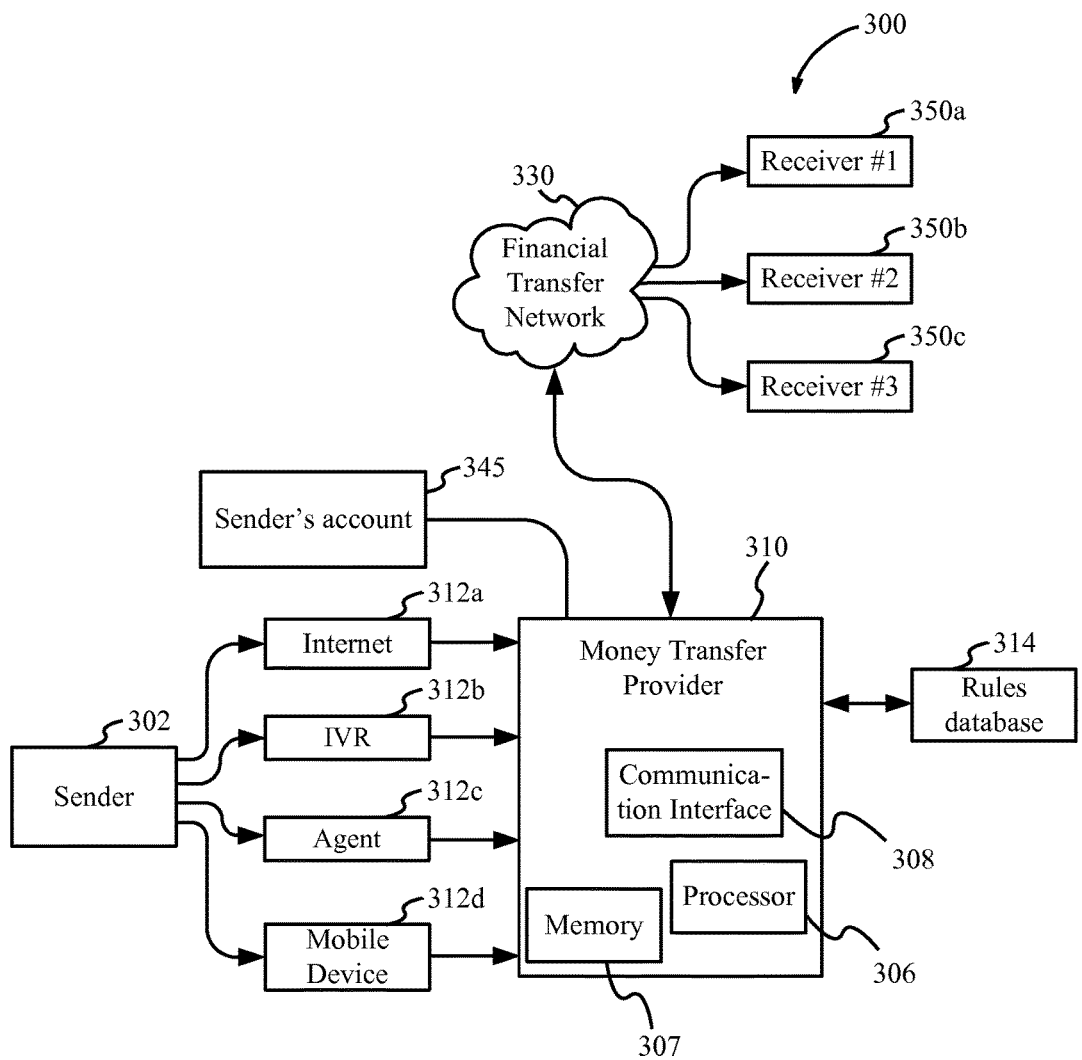
FIG. 3 is still another block diagram illustrating a system for performing value-advance money transfers according to embodiments of the present invention.

FIG. 3 illustrates another system 300 for performing a value-advance money transfers. The system 300 is similar to system 200 previously described except that the financial transfer network 330 is shown as being communicatively coupled with a plurality or group of receivers (i.e., receiver #1 350a, receiver #2 350b, and receiver #3 350c). In this manner, the sender 302 may initiate a value-advance money transfer to send funds to any or a combination of the plurality or group of receivers 350a-350c. In some embodiments, the plurality or group of receivers 350a-350c may be predetermined and/or limited by the sender 302 so that when using the value-advance money transfer program, the funds are restricted to being transferable to the plurality or group of receivers only.

Restricting the transferability of funds to the plurality or group of receivers 350a-350c adds security to the value-advance money transfer program because it discourages theft or misappropriation of a sender's value-advance money transfer information. For example, restricting the transferability to the plurality or group of receivers 350a-350c does not allow an individual who has stolen a sender's information to make a value-advance money transfer to himself or herself on the sender's account unless that individual is within the group of receivers 350a-350c. Because the individuals within the plurality or group of receivers 350a-350c are often the beneficiaries of regular and reoccurring money transfers, they are unlikely to steal or misappropriate the sender's information. In addition, the sender 302 may be provided with an identifier associated with the value-advance money transfer program. To perform a value-advance money transfer, the sender may be required to provide the identifier to the money transfer provider 310. The identifier may be configured so that, upon presentation to the money transfer provider, the money transfer provider is alerted to the fact that the transferability is restricted to the plurality or group of receivers 350a-350c.

In other embodiments, the plurality or group of receivers 350a-350c is not restricted to a predetermined group of receivers and/or the sender is able to add additional receivers to the plurality or group of receivers 350a-350c. Similarly, the value-advance money transfer program may be configured to allow receivers to request that the sender include them in the plurality or group of receivers 350a-350c. In any case, the sender may transfer funds to any or a combination of the plurality or group of receivers 350a-350c. For example, the sender may select to transfer funds to receiver #2 350b and receiver #3 350c or the sender may select to transfer funds to receiver #1 350a only. In addition, FIG. 3 shows the sender's account being maintained by the money transfer provider 310. In some embodiments, the sender's account may be maintained by an entity other than the money transfer provider 310 as described with reference to FIG. 1 and/or any or all of the group of receivers may have accounts maintained by the money transfer provider 310.

Figure 4:
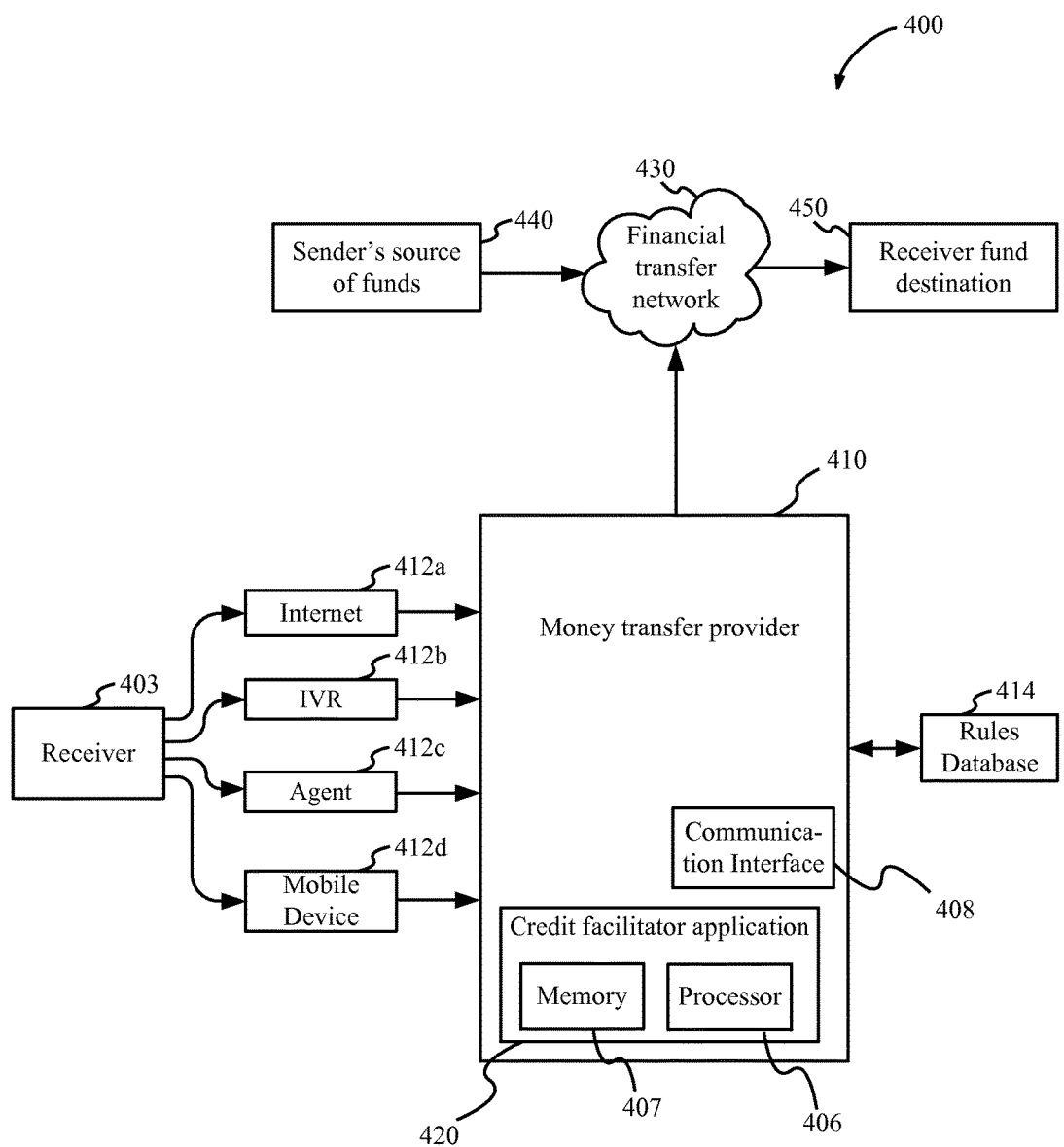
FIG. 4 is still another block diagram illustrating a system for performing value-advance money transfers according to embodiments of the present invention.

FIG. 4 illustrates another system 400 for performing value-advance money transfers. The system 400 of FIG. 4 is similar to systems 100-300 described in FIGS. 1-3 respectively, except that the money transfer provider 410 is shown as being communicatively coupled to communication devices 412a-412d so that a receiver 403 may request and/or initiate a value-advance money transfer and thereby transfer funds from a sender's source of funds 440 to a fund destination 450 of the receiver. In this manner, the receiver may participate in the value-advance money transfer program.

For example, in some embodiments both the sender (not shown but see FIGS. 1-3) and the receiver 403 are enrolled or otherwise participate in the value-advance money transfer program. In other embodiments, the receiver 403 only may be enrolled or otherwise participate in the value-advance money transfer program. Embodiments in which the receiver 403 may request and/or initiate a value-advance money transfer and thereby participate in the value-advance money transfer program are described in more detail with reference to FIGS. 11 and 12.

In addition, in some embodiments, the money transfer provider 410 may utilize a credit facilitator application 420 that may perform the same functions as the credit program facilitator described in FIG. 1. In other embodiments, the money transfer provider 410 may be communicatively coupled to a credit program facilitator as described in FIG. 1.

Figure 5:
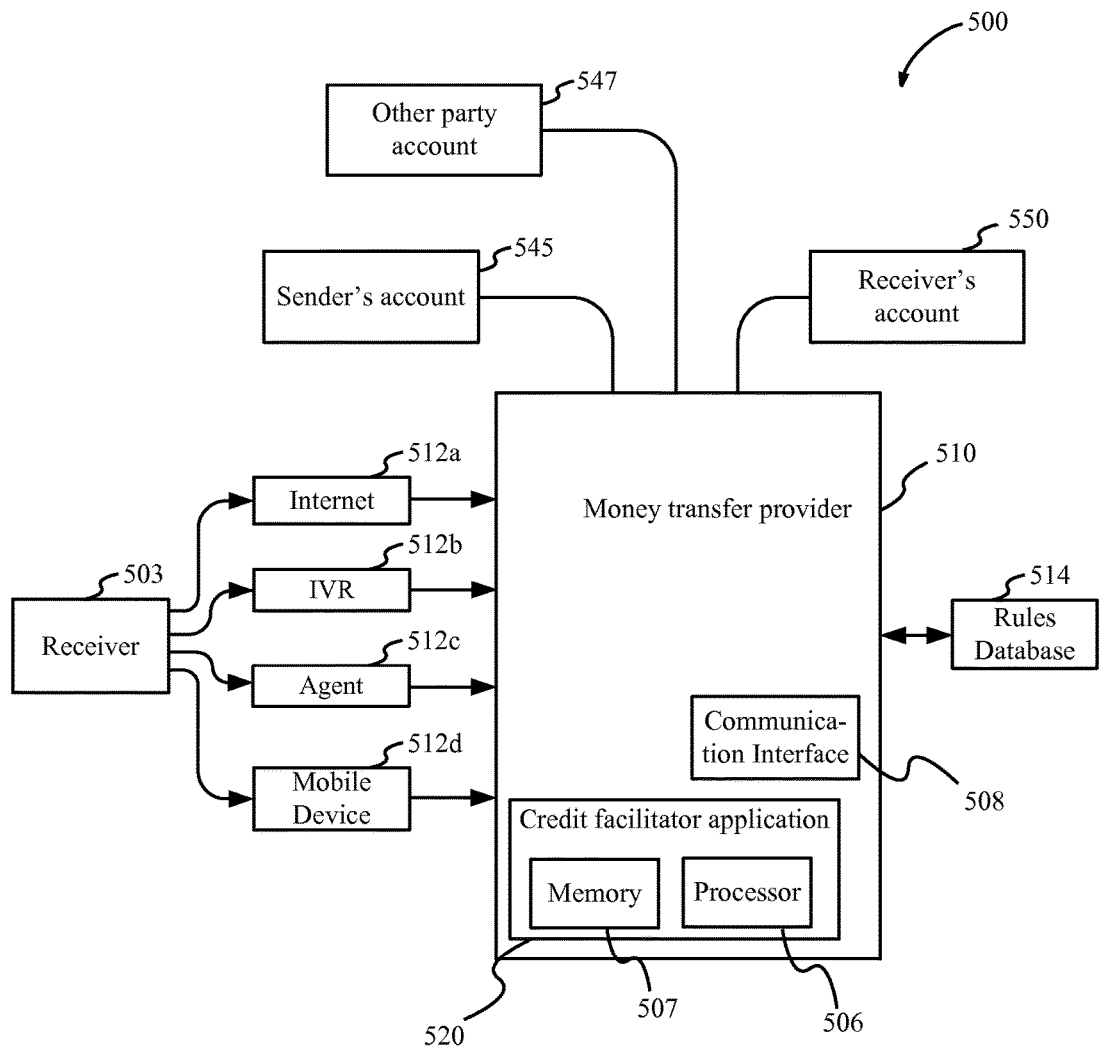
FIG. 5 is still another block diagram illustrating a system for performing value-advance money transfers according to embodiments of the present invention.

FIG. 5 illustrates another system 500 for performing value-advance money transfers. The system 500 is similar to system 400 in that the money transfer provider 510 is communicatively coupled to communication devices 512a-512d so that a receiver 503 may communicate with the money transfer provider 510 and thereby request and/or initiate a value-advance money transfer.

The system 500 also shows the money transfer provider 510 maintaining and/or controlling several accounts for the sender 545, the receiver 550, and one or more other parties 547. With such an arrangement, funds may be transferred between any of the accounts in connection with a value-advance money transfer as described in more detail below (e.g., funding a money transfer and/or repaying advanced funds). For example, in some embodiments, funds may be advanced to the sender's account 545 from the money transfer provider 510 so that a value-advance money transfer is funded. In such situations, the sender usually is required to repay the advanced funds. To facilitate repayment, funds may be transferred to the sender's account 545 from the receiver's account 550 and/or from one or more other parties' accounts 547. In other embodiments, the funds may be advanced to the sender's account 545 from one or more other parties' accounts 547 or from a pool of accounts (not shown) to fund the value-advance money transfer.

Further, the transfer of funds from one or more accounts to repay any advanced funds may occur in accordance with one or more rules maintained in the rules database 514, which rules may be provided by any or a combination of the sender (not shown), the receiver 503, and the money transfer provider 510. In addition, any or a combination of the senders' account 545, the receiver's account 550, and the other party account 547 may be maintained or controlled by an entity other than the money transfer provider 510.

Figure 6:
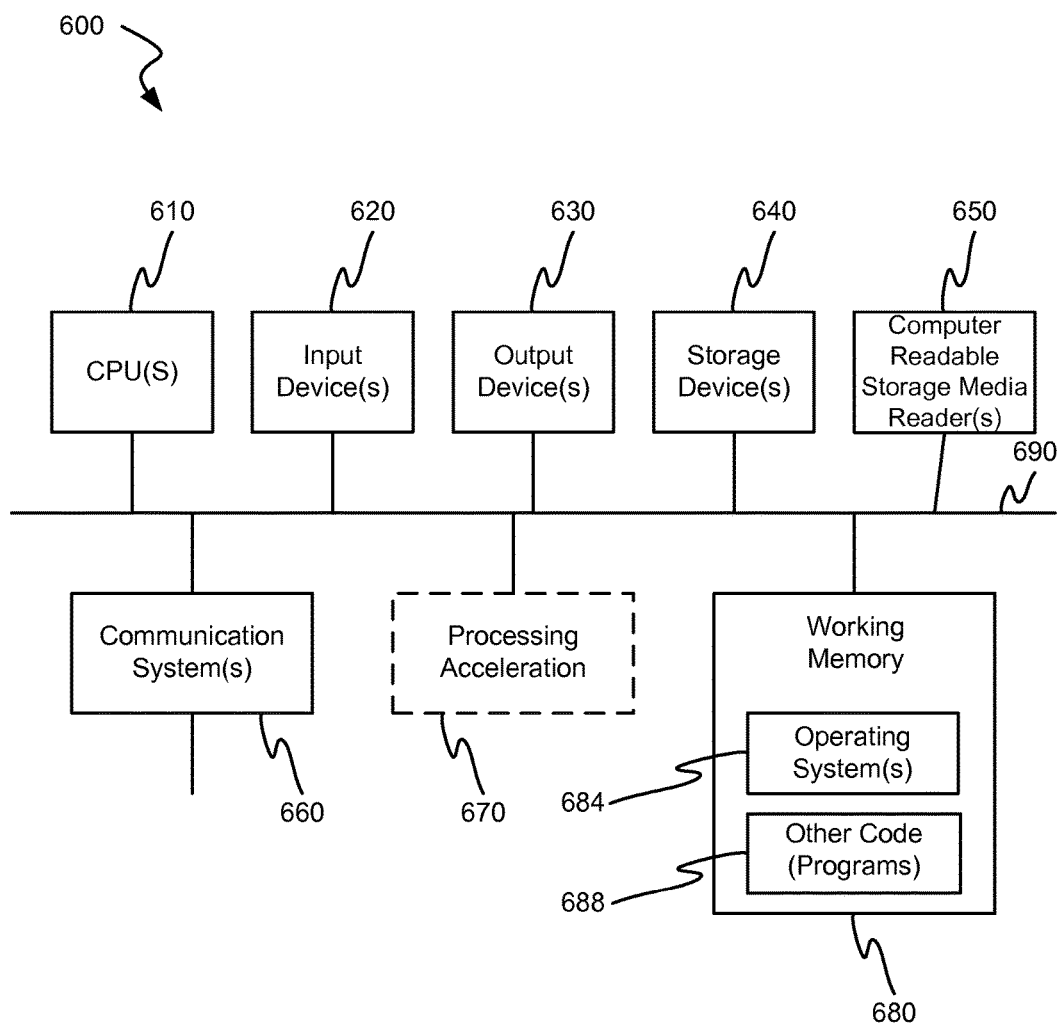
FIG. 6 is a block diagram illustrating a computer that is capable of performing the methods and operations of systems according the embodiments of the invention.

FIG. 6 is a block diagram illustrating a computer system upon which embodiments of the present invention may be implemented. This example illustrates a computer system 600 such as may be used, in whole, in part, or with various modifications, to provide the functions of the money transfer provider 110-510, the credit program facilitator 120 and/or credit program application 420 and 520, the communication interface 108-508, the processor 106-506, the memory device 107-507, and/or other components of the invention such as those discussed above.

The computer system 600 is shown comprising hardware elements that may be electrically coupled via a bus 690. The hardware elements may include one or more central processing units 610, one or more input devices 620 (e.g., a mouse, a keyboard, etc.), and one or more output devices 630 (e.g., a display device, a printer, etc.). The computer system 600 may also include one or more storage devices 640. By way of example, storage device(s) 640 may be disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 650, a communications system 660 (e.g., a modem, a network card (wireless or wired), an infra-red communication device, Bluetooth™ device, cellular communication device, etc.), and working memory 680, which may include RAM and ROM devices as described above. In some embodiments, the computer system 600 may also include a processing acceleration unit 670, which can include a digital signal processor, a special-purpose processor and/or the like.

The computer-readable storage media reader 650 can further be connected to a computer-readable storage medium, together (and, optionally, in combination with storage device(s) 640) comprehensively representing remote, local, fixed, and/or removable storage devices plus storage media for temporarily and/or more permanently containing computer-readable information. The communications system 660 may permit data to be exchanged with a network, system, computer and/or other component described above.

The computer system 600 may also comprise software elements, shown as being currently located within a working memory 680, including an operating system 684 and/or other code 688. It should be appreciated that alternate embodiments of a computer system 600 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 600 may include code 688 for implementing any or all of the function of the various elements of the architecture as described herein. For example, software, stored on and/or executed by a computer system such as system 600, can provide the functions of the money transfer provider 110-510, the credit program facilitator 120 and/or credit program application 420 and 520, the communication interface 108-508, the processor 106-506, the memory device 107-507, and/or other components of the invention such as those discussed above.

Figure 7:
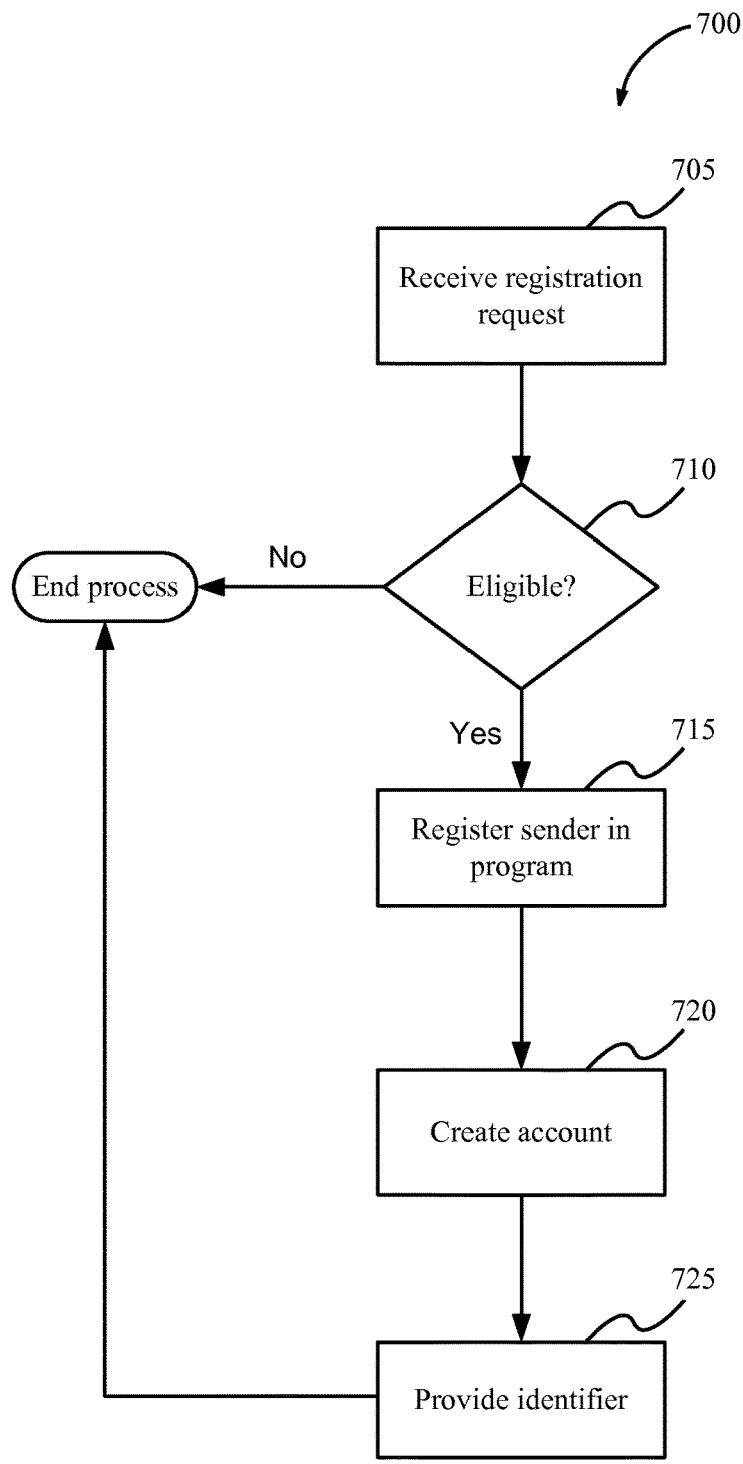
FIG. 7 illustrates a process of enrolling a sender and/or receiver in a value-advance money transfer program according to embodiments of the present invention.

FIG. 7 illustrates a process of registering or enrolling a sender in a value-advance money transfer program. The value-advance money transfer program allows the sender and/or receiver to make a money transfer regardless of whether the sender has funded the money transfer. For example, in some instances, due to an unpredictable pay schedule, etc., the sender may be temporarily unable to fund the money transfer. In those instances, funds may be advanced to the sender from the money transfer provider, a credit program facilitator, another party account maintained by the money transfer provider, etc., to facilitate in funding the money transfer. Often, the sender will be required to repay the advanced funds, although in some embodiments, repayment is not be required.

In some embodiments, the process begins with a money transfer provider receiving a registration request (block 705) from the sender and/or receiver that desires to register in the value-advance money transfer program. The registration request may be received over one of the communication devices (e.g., 112a-112d). In other embodiments, the money transfer provider may extend an invitation to the sender and/or receiver to register in and/or participate in the value-advance money transfer program without receiving a registration request.

At block 710, the money transfer provider determines whether a sender and/or receiver is eligible to participate in the value-advance money transfer program. The determination may be based on one or more conditions. For example, the determination may be made on one or more of the following conditions: a registration request from the sender to participate in the value-advance money transfer program, a history of money transfers using the money transfer provider, a payment of one or more fees to participate in the value-advance money transfer program, a credit score, a loyalty member status, etc. In embodiments where the sender and/or receiver request registration to participate in the value-advance money transfer program, the money transfer provider may receive and/or request one or more pieces of information (e.g., credit score, employment information, etc.) from the sender or receiver to determine the sender or receiver's eligibility to participate in the program. In addition, the money transfer provider may charge the sender and/or receiver one or more fees to participate in the program, which may be a recurring or one time fee.

In embodiments where the money transfer provider determines to extend an invitation without receiving a registration request, the decision to extend the invitation may be based on the sender and/or receiver's rapport with the money transfer provider. For example, the money transfer provider can evaluate the amount and frequency of the money transfers the sender conducts with the money transfer provider. Similarly, the money transfer provider can evaluate the frequency and regularity with which a receiver receives money transfers. The money transfer provider can also evaluate any issues and/or delays that are associated with the sender or receiver's money transfers. Similarly, the money transfer provider may evaluate the sender or receiver's loyalty status, such as evaluating the frequency with which a loyalty member card is used without any issues.

Determining eligibility may also involve establishing one or more rules that limit the amount of funds that may be advanced during any money transfer and/or that may be advanced in total. For example, the rules may limit the amount of funds that may be advanced in any money transfer to $200 and may further limit the total amount of funds that may be advanced to $1,000. The limit may depend on the sender and/or receiver's rapport with the money transfer provider, a history of money transfers with the money transfer provider, and/or a history of money transfers while being enrolled in a value-advance money transfer program. The limit may be increased or decreased based on the sender or receiver's history with the money transfer provider or history while registered in the value-advance money transfer program (e.g., any past or future value-advance money transfer problems).

In addition, the rules may also limit or restrict the receivers that are eligible to receive funds or may limit or restrict the senders that are able to provide funds in connection with the value-advance money transfer program. For example, in some embodiments, the rules may limit the receivers that are eligible to receive funds from a sender to a predetermined group of receivers. The predetermined group of receivers may be selected by the money transfer provider and/or the sender. For example, the money transfer provider may limit the group of receivers to those receivers that regularly receive money transfers from the sender. A predetermined group of receivers may add security to the value-advance money transfer program because it does not allow a money transfer to be made to anyone other than the receivers within the predetermined group of receivers. Thus, if a sender's value-advance money transfer program information were stolen or otherwise misappropriated, the thief would be limited to transferring funds to one or more of the receivers in the group of receivers. Likewise, the receiver may be limited to receiving money transfers from senders that are within a predetermined group of senders, which may also be determined by the receiver and/or by the money transfer provider. Similarly, the group of senders may be limited depending on the regularity of money transfers between the sender and receiver.

At block 715, after the sender and/or receiver's eligibility has been determined, the sender and/or receiver is registered in the value-advance money transfer program. At block 720, an account may be established or created that is associated with the sender and/or receiver. In some embodiments, the money transfer provider establishes and maintains the account. In other embodiments, the account is established and maintained by a credit program facilitator such as a bank, credit union, etc. At block 725, an identifier may be provided to the sender and/or receiver. The identifier may allow the sender or receiver to access the value-advance money transfer program and thereby initiate a value-advance money transfer and/or the identifier may be linked to the group of receivers or senders so that, upon providing the identifier, the money transfer provider limits the sender to the predetermined group of receivers or limits the receiver to the predetermined group of senders. The identifier may be a separate value-advance money transfer program card or may be associated with a loyalty card such as being an upgrade or addition to a pre-existing loyalty card (e.g., an upgrade to a gold member card). Alternatively, the identifier may be a group of coupons provided in a coupon book so that individual coupons may be torn off and removed from the coupon book and provided to the money transfer provider to initiate a value-advance money transfer. Similarly, the identifier may be a personal identification number chosen by the sender or receiver.

Subsequent to being registered in the value-advance money transfer program, the sender and/or receiver may perform value-advance money transfer as described below.

Figure 8:
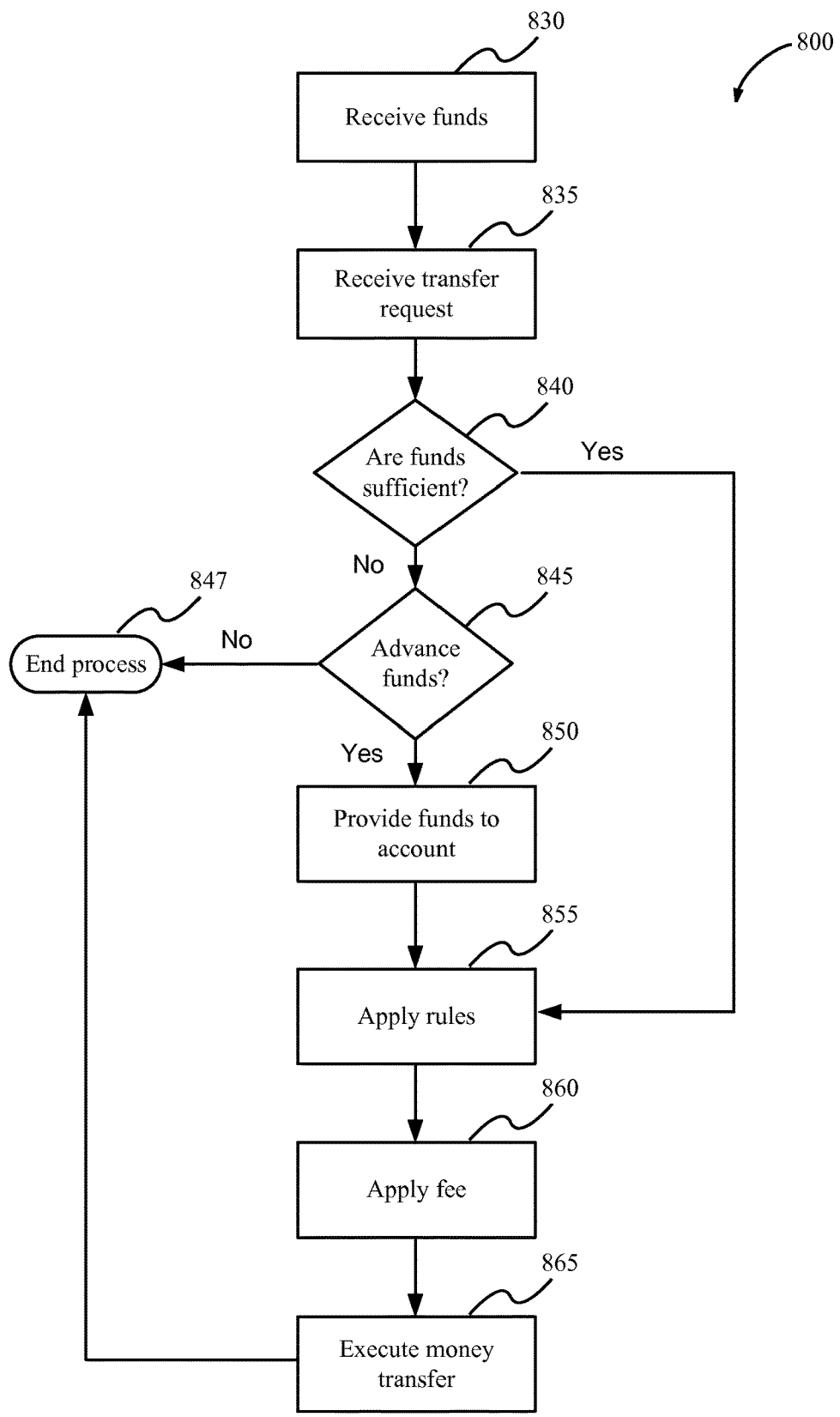
FIG. 8 illustrates a process of performing a value-advance money transfer according to an embodiment of the present invention.

FIG. 8 illustrates a process 800 of performing a value-advance money transfer according to an embodiment of the invention. The process 800 occurs after a sender has been registered in a value-advance money transfer program such as described in reference to FIG. 7. Optionally, in some embodiments, the process 800 begins with the money transfer provider receiving one or more fund payments from the sender to cover one or more money transfers (block 830). In other embodiments, the value-advanced money transfer may occur without the sender providing any funds. If the sender does provide funds, the funds may be used in several ways to cover future money transfers. For example, in some embodiments, the sender pays an extra amount in each money transfer for assurance that funds will be advanced in the future when a money transfer is insufficiently funded (i.e., the sender pays one or two dollars more in each money transfer to pay for the value-advance option). In such embodiments, the sender may or may not be required to repay any advanced funds.

In another embodiment, the sender pays an excess amount in each money transfer, which is collected and kept in the account associated with the sender. Over time the excess payments will accumulate in the account and may be used to cover any insufficiently funded money transfers. In such an embodiment the sender will normally not be required to repay the advanced funds because the funds were provided from the sender's accumulated excess payments. Similarly, in another embodiment, multiple senders that are registered in the value-advanced money transfer program may pay an excess amount in each money transfer, which may be collected and kept in a pooled account of excess payments so that any of the senders registered in the value-advance money transfer program may draw from the pooled account to cover an insufficiently funded money transfer. Alternatively, the money transfer provider may be able to draw from one sender's account to fund another sender's insufficiently funded money transfer. In these embodiments, the sender will normally be required to repay the advanced funds since they are drawing from another party's account.

At block 835, the money transfer provider receives a money transfer request. The money transfer request may be received by either the sender or receiver and may be received through one of the previously described communication devices such as via an agent of the money transfer provider or the Internet. At block 840, the money transfer provider determines if the funds in the account associated with the sender are sufficient to cover the money transfer request. If the funds are sufficient to cover the money transfer, the money transfer provider may proceed to apply one or more rules as in block 855 without advancing any funds to the sender. At 845, if the funds are insufficient, the money transfer provider may optionally determine whether to advance funds to the sender. The determination may be based on the amount of funds that needs to be advanced, how long the sender and/or receiver has been enrolled in the value-advance money transfer program, a history of money transfers involving the sender and/or receiver, the frequency with which the sender and/or receiver has used the value-advance money transfer program, etc.

If the money transfer provider determines not to advance any funds (e.g., the amount of necessary funds is too high, the program has been used too frequently, etc.), the process is terminated at block 847. If the money transfer provider determines to advance funds, the advanced funds are provided to the account associated with the sender (block 850). The advanced funds are made available for the sender to use in transacting the money transfer. At block 855, one or more rules may optionally be applied to the money transfer such as limiting the eligible receivers to the predetermined group of receivers and/or limiting the amount of the money transfer. In addition, the money transfer provider may provide one or more rules that describe how the sender and/or receiver is to repay the advanced funds such as by providing a repayment schedule. At block 860, the money transfer may optionally apply one or more fees and/or interest rates to the money transfer as payment for facilitating the value-advance money transfer and/or advancing funds to the sender's account. At block 865, the money transfer provider executes the money transfer to transfer the funds from the sender's account to the receiver (e.g., receiver's bank account, check or cash at an agent location of the money transfer provider, etc.).

Figure 9:
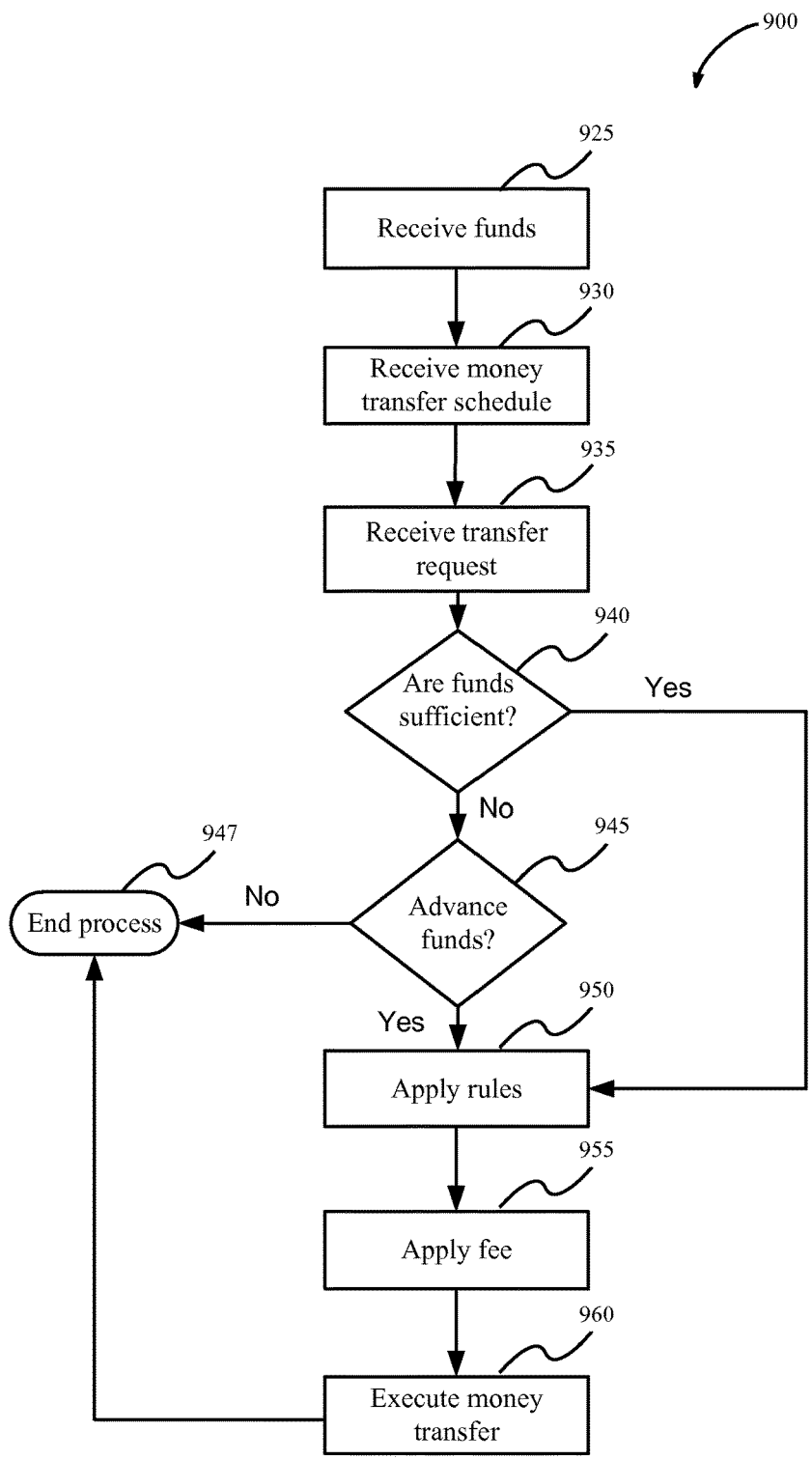
FIG. 9 illustrates another process of performing a value-advance money transfer according to an embodiment of the present invention.

FIG. 9 illustrates another process 900 of performing a value-advance money transfer according to an embodiment of the invention. Similar to FIG. 8, the process 900 may optionally begin with the money transfer provider receiving funds from the sender (block 925). At block 930, the money transfer provider may receive a money transfer schedule from the sender that defines how multiple money transfers are to be made over a specified period of time (e.g., the money transfer schedule instructs the money transfer provider to make a money transfer on the first of the month each month for one year to one or more receivers; the money transfer schedule instructs the money transfer provider to make a money transfer on the first of the month to one receiver and a money transfer mid-month to another receiver; etc.). Using a money transfer schedule may ease the sender's burden because the sender will not be required to visit the money transfer provider's location, either physically or remotely, each time a money transfer is made.

Similarly, in connection with the funds received at block 925, the sender may provide one or more lump sums over the specified period of time to cover most or all of the money transfers defined in the money transfer schedule. In this manner, the burden to ensure that the receiver receives the funds according to the money transfer schedule (e.g., at the beginning of each month) is shifted from the sender to the money transfer provider. For example, the sender may provide half of all the required funds at the beginning of the specified period of time (e.g., January 1) and then provide the other half of the required funds around the mid-point of the specified period of time (e.g., May 1 or June 1). The receiver would then receive the funds according to the money transfer schedule (e.g., at the beginning of every month) without the sender being required to visit the money transfer provider's location and initiate each money transfer. In addition, the process can be configured so that a portion of each or some of the sender's paychecks is automatically routed to the money transfer provider to cover the money transfers defined in the money transfer schedule.

At block 935, the money transfer provider receives a money transfer request. The request may be generated and received automatically by the money transfer provider in accordance with the money transfer schedule (e.g., a program of the money transfer provider automatically generates and sends a request when a money transfer is due) or, alternatively, the request may be received by the sender in accordance with the money transfer schedule or as a new money transfer request. At block 940, the money transfer provider determines if the funds in the account associated with the sender are sufficient to cover the money transfer request. If the funds are sufficient, then the money transfer provide may proceed to apply one or more rules at block 950. If the funds are not sufficient, the money transfer provider determines whether to advance funds to the account associated with the sender (block 945). In this manner, funds may be advanced even when the sender has provided one or more lump sums to cover the money transfers defined by the money transfer schedule.

For example, with reference to the example above where the sender provides half of the required funds at the beginning of the specified period of time (e.g., January 1, the specified period of time is 1 year, and money transfers are made at the beginning of every month), the sender may not provide the other half until close to the end of the specified period of time (e.g., October 1). In this instance, at the midpoint of the specified period of time (e.g., July 1) the money transfer provider would determine that the funds in the sender's account are insufficient to cover the money transfer and would further determine whether to advance funds to the sender's account. The same process would be repeated for each money transfer until the sender provided additional funds to cover the money transfers or until the money transfer provider declined to advance funds (e.g., the process would be repeated for August and September). The value-advance money transfer program allows the money transfers to continue in accordance with the money transfer schedule even though the sender has not provided sufficient funds to cover the money transfers.

If the money transfer provider determines not to advance the funds, the process 900 is terminated at block 947. If the money transfer provider determines to advance the funds, the process 900 proceeds to block 950 where one or more rules may be applied to the money transfer. The rules that are applied may be provided by the sender with the money transfer schedule and may condition the receipt of the money on the occurrence of one or more events. For example, the sender may provide a rule that conditions the receipt of money on the receiver complying with one or more guidelines such as the receiver maintaining a specified GPA in school, using the money to pay a mortgage payment, pay child support, etc. The receiver may be required to provide proof of compliance before the money is transferred to the receiver. In this manner, the sender may control the timing of the disbursement of funds while controlling the receiver's compliance with a set of guidelines without having to visit a location of the money transfer provider each time a money transfer is performed. Alternatively or additionally, the rules may condition the receipt of money on one or more conditions unconnected to the actions of the receiver such as the sender securing additional employment, etc.

At block 955, the money transfer provider may apply one or more fees and/or interest rates to the money transfer. For example, the money transfer provider may apply a fee to each of the lump sums received from the sender to pay for the services associated with the money transfer schedule. Additionally, the money transfer provider may apply a fee each time a money transfer is executed, which may pay for the value-added money transfer services. Additionally, an interest rate may be applied to the advanced funds to encourage prompt repayment. At block 960, the money transfer is executed in accordance with the money transfer schedule.

Figure 10:
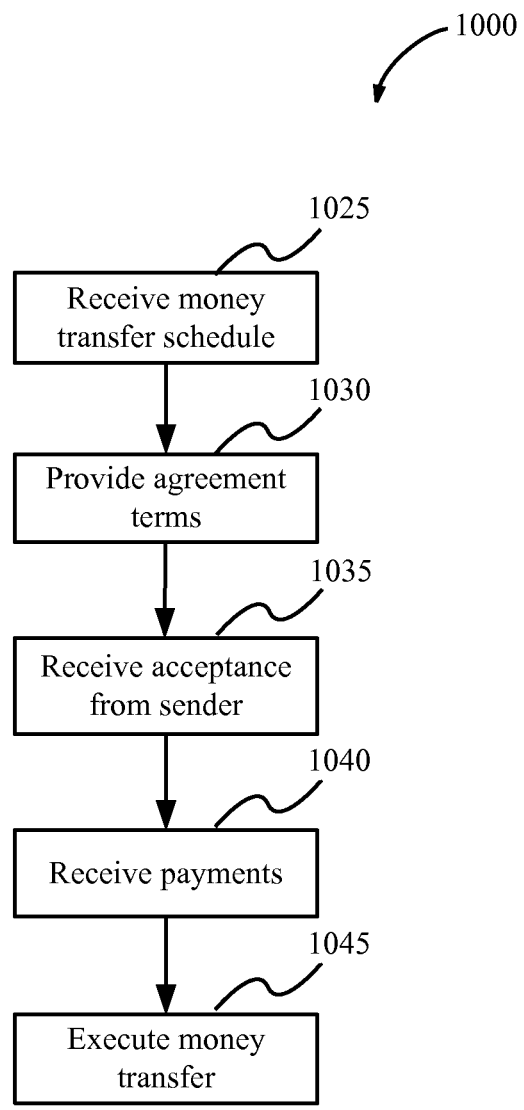
FIG. 10 illustrates another process of performing a value-advance money transfer according to an embodiment of the present invention.

FIG. 10 illustrates another process 1000 of performing a value-added money transfer according to an embodiment of the present invention. The process 1000 describes a method in which one or more terms of a money transfer may be fixed or locked. The process 1000 may optionally begin with the money transfer provider receiving a money transfer schedule (block 1025) as previously described with reference to FIG. 9. In any case, the process 1000 typically begins with a money transfer schedule being established in which the money transfer schedule defines that a plurality of money transfers are to be made over a specified period of time. At block 1030, the money transfer provider may provide one or more terms associated with the money transfer schedule that fix or lock one or more fees, interest rates, and/or other charges associated with money transfers so that the fees or other charges do not change over the specified period of time.

For example, the terms may provide that the money transfer provider's fee for each money transfer, the interest rate used for advanced funds, and/or that an exchange rate used during each money transfer will be fixed over the specified period of time. For example, the money transfer schedule may direct the money transfer provider to make a $200 money transfer on the first of each month over a year period. The terms may provide that a fixed fee of $5 will apply to each money transfer (12 in all), an interest rate of 5% will apply to any advanced funds, and a fixed exchange rate of 1.1/1 will apply to each fund conversion to convert the funds into the receiver's home country currency. Alternatively, the fee and/or exchange rate may vary, but the variance could be fixed in the terms provided by the money transfer provider (e.g., the initial fee will be $15 and each fee thereafter will decrease by $1; the interest rate for any advance funds may vary between, but not exceed, the range of 4% to 7%; the exchange rate may vary but will not exceed the range of 0.9/1 to 1.1/1; etc.). By providing fixed terms for each money transfer in the money transfer schedule, the sender's approximate costs for the plurality of money transfers can be closely estimated over the specified period of time and the sender can lock in favorable money transfer terms. In addition, when the foreign exchange rate is fixed, the risks associated with foreign exchange variability are passed on to the money transfer provider.

At block 1035, the money transfer provider receives an acceptance of the provided terms from the sender. In some embodiments, the money transfer provider receives one or more payments (block 1040) to be used toward the plurality of money transfers defined in the money transfer schedule or toward paying any fees and/or other charges. In other embodiments, funds may be advanced to the sender's account to fund a money transfer as previously described. At block 1045, a money transfer is executed in accordance with the money transfer schedule and in accordance with the one or more agreed upon terms.

Figure 11:
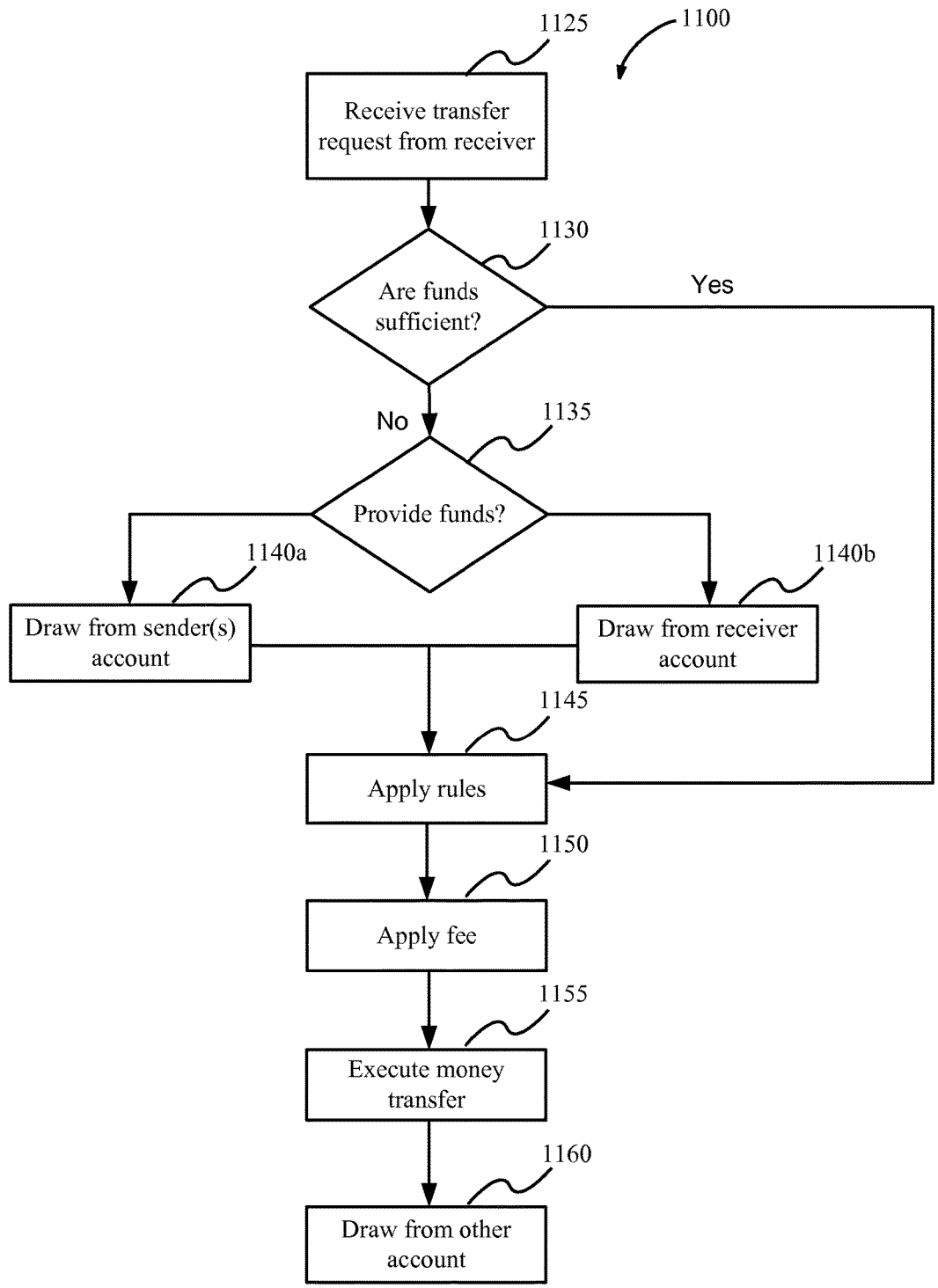
FIG. 11 illustrates a process of performing a value-advance money transfer in which the receiver provides the money transfer request in accordance with an embodiment of the present invention.

FIG. 11 illustrates a process 1100 of performing a value-advance money transfer in which the receiver provides the money transfer request and in which another party, such as the sender, may be obligated to repay funds that were advanced to pay the receiver. At block 1125, the process begins with the money transfer provider receiving a money transfer request from the receiver. The request may specify one or more accounts from which the receiver desires to receive funds. For example, the request may provide that the funds are to be received from two senders' accounts, from the receiver's account and a sender's account, or the request may provide that a certain amount of funds are desired, in which case funds are drawn from one or more accounts selected by the money transfer provider (e.g., funds are drawn from the receiver's account first and then from one or more senders' accounts if the receiver's account is not sufficiently funded). At block 1130, a determination is made whether the specified account has sufficient funds to cover the money transfer request.

If the funds are sufficient, one or more rules can be applied to the money transfer at block 1145. If the funds are not sufficient, a determination is made whether to provide funds to the specified account (block 1135). Since the receiver is both requesting the funds and specifying an account to which funds may need to be advanced, the receiver, in essence, is selecting which party will be obligated to repay the advanced funds (e.g., designating the sender to repay the funds). As such, the determination made at block 1135 may take into account the willingness of the obligated party (e.g., the sender) to take on the obligation. As part of the determination, the money transfer provider may evaluate a money transfer history between the sender and the receiver and further evaluate whether the sender and/or receiver have engaged in any value-advance money transfers previously. For example, if the sender has regularly and repeatedly performed money transfers with the sender in the past (e.g., once a month for more than one year, etc.), the money transfer provider may be more willing to advance funds to the sender's account to fund the receiver's request than if the sender and receiver have engaged in occasional and sporadic money transfers (e.g., one money transfer in the last five years).

In addition, an agreement may exist between any or all of the sender, the receiver, and the money transfer provider regarding value-advance money transfers (e.g., the money transfer schedule) that the money transfer provider may use to determine if the sender is willing to be obligated for the advanced funds. In such an embodiment, the money transfer provider is nearly assured that future funds will be transferred from the sender to the receiver and the money transfer provider will essentially be advancing funds to the receiver ahead of schedule (i.e., advancing funds that are defined in the money transfer schedule ahead of the scheduled dates). The agreement (e.g., the money transfer schedule) may include one or more rules regarding how the money is to be repaid to the money transfer provider. For example, the rules may direct that, after a fixed amount of time, the receiver must provide funds to repay any or all of the advanced funds (e.g., after 3 months the receiver must pay half of the advanced funds; after 3 months funds are drawn from the receiver's account 1140*b* and applied to the sender's account 1140*a*) or the rules may direct the money transfer provider to withhold a certain percentage of the funds from the sender's future money transfers to the receiver to repay the advanced funds. In addition, the receiver may also provide one or more rules that direct how the funds are paid back. For example, the receiver may direct that after a specified period of time, the sender's account is repaid the advanced funds from the account of an additional sender that is associated with the receiver (e.g., sender A's account is credited with funds drawn from either or both of sender B's and sender C's account to repay the advanced funds). In addition, the receiver and/or the sender may direct the money transfer provider to withhold a portion or percentage of funds transferred to the receiver from multiple senders to repay the advanced funds (e.g., withhold 5% of all funds transferred to the receiver from any sender). The previous description describes several ways in which funds may be transferred between a variety of accounts to repay the advanced funds, although a variety of possibilities exist for using the rules to repay the advanced funds in accordance with the present invention.

At block 1135, if the determination is made not to advance the funds to the specified account, the process ends (not shown). If the determination is made to advance the funds, the money transfer provider may draw the funds from either or both of the sender(s)'s account and/or from the receiver's account in accordance with the transfer request. At block 1145, one or more rules may be applied to the money transfer such as described above. At block 1150, one or more fees may be applied to the money transfer and the money transfer may be executed at block 1155 to provide the requested funds to the receiver. In addition, at block 1160, funds may be drawn from one or more other accounts to repay the advanced funds as previously described.

Figure 12:
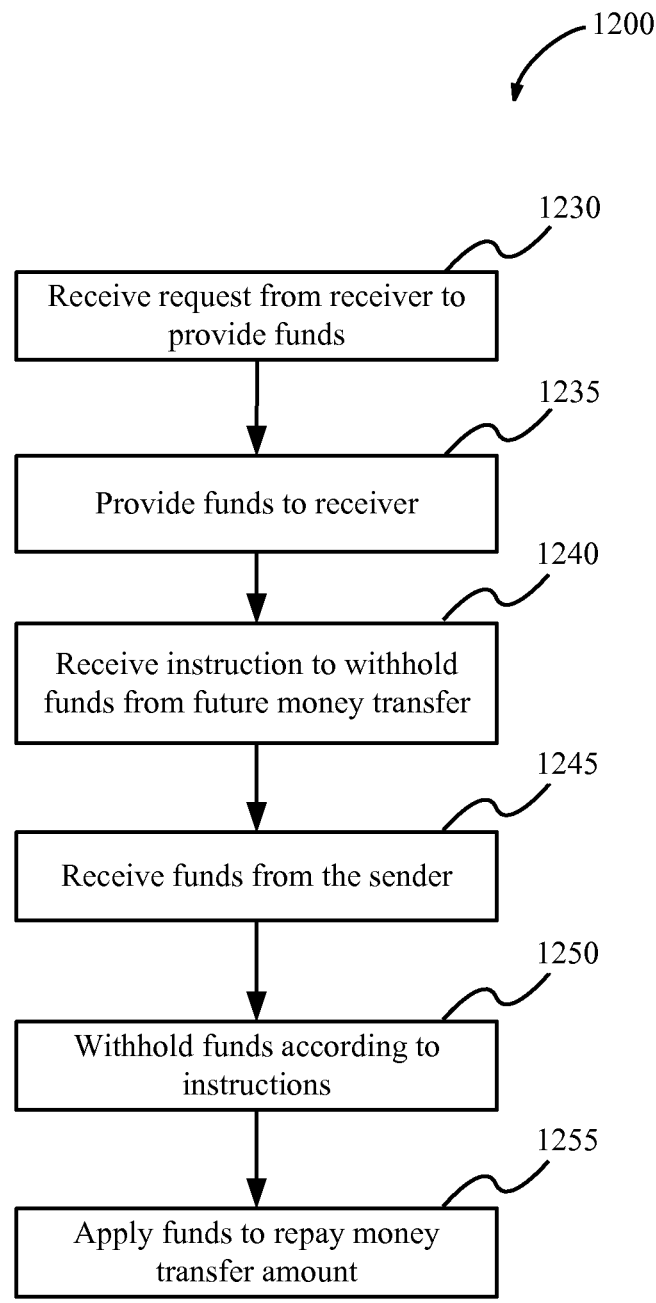
FIG. 12 illustrates a process of advancing funds to a receiver in which the sender may not be registered in a value-advance money transfer program according to an embodiment of the present invention.

FIG. 12 illustrates a process 1200 of advancing funds to a receiver in which the sender may not participate in a value-advance money transfer program. The process 1200 may begin with the money transfer provider receiving a request from the receiver to provide funds to the receiver (block 1230) as discussed with reference to FIG. 11. One of the differences between process 1100 and process 1200 is that the sender is not registered in the value-advance money transfer program and, therefore, the sender will not be obligated to repay the advanced funds. Rather, the funds are advanced to the receiver or the receiver's account and the receiver is obligated to repay the funds. At block 1235 the money transfer provider determines to provide funds to the receiver. The determination to provide funds may be based on a history of money transfer between one or more senders and the receiver. For example, one or more sender may regularly and repeatedly transfer money to the receiver via the money transfer provider (e.g., sender A transfers funds to receiver B every month for over one year; sender B transfers funds every other month to receiver B for the last eight months, etc.). Due to the history of money transfers between the one or more senders and the receiver, the money transfer provider may have confidence that subsequent money transfers will occur and, hence, have confidence in advancing funds because of the high likelihood that the receiver will receive enough funds from future money transfers to repay the advanced funds.

At block 1240, the money transfer provider may receive one or more instruction from the receiver instructing the money transfer provider to withhold a portion or percentage of funds from future money transfers to repay the advanced funds. For example, along with the request, the receiver may provide an instruction to the money transfer provider to withhold $10 from every money transfer from sender A and/or to withhold $5 from every money transfer from sender B until the advanced funds are repaid. The instruction may be associated with a money transfer schedule provided by the sender so that the receiver and/or money transfer provider can determine approximately how much funds to withhold from a specified number of money transfers and approximately when the advanced funds will be repaid. Further, the instructions from the receiver may direct the money transfer provider to withhold a portion or percentage of funds from future money transfers that the receiver will perform to transfer funds to other receivers (i.e., withhold funds when the receiver is participating as a sender).

At block 1245, the money transfer provider receives funds form the sender specified in the receiver's instruction. At block 1250, the money transfer provider withholds a percentage or portion of the funds according to the receiver's instructions and, at block 1255, the money transfer provider applies the withheld funds to repay all or a portion of the advanced funds.

Figure 13:
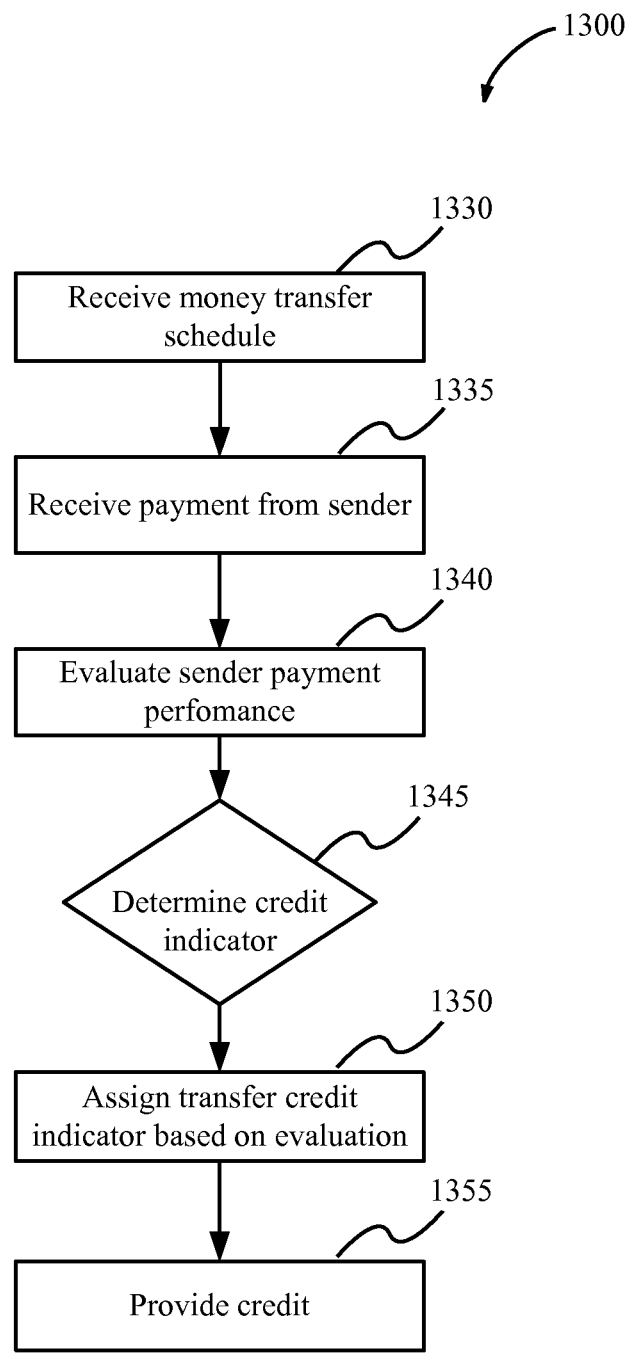
FIG. 13 illustrates a process for providing a credit indicator based on a money transfer pattern according to an embodiment of the present invention.

FIG. 13 illustrates a process 1300 for providing a credit indicator based on a money transfer pattern or performance. The transfer credit indicator may be used by the money transfer provider and/or any other entity for a variety of purposes including: extending credit, marketing, cross selling other products and services, etc. The process 1300 may begin at block 1330 with the money transfer provider receiving a money transfer schedule. The money transfer schedule may define a plurality of money transfers to be made over a specified period of time (e.g., transfer $100 to receiver A every month for the next two years; transfer $50 to receiver B every two weeks for the next 5 months, etc.). Further, the money transfer schedule may be associated with or otherwise connected to a bill payment so that the money transfer schedule defines that at least one of the plurality of money transfers is to pay a bill (e.g., transfer the amount defined in my monthly electric bill to the electric company).

At block 1335, the money transfer provider receives one or more payments over the specified period of time to cover the plurality of payments. For example, the sender may provide $100 every two weeks, $300 every other month, $25 per paycheck, etc., to cover the plurality of money transfers. Similarly, the money transfer schedule may include a payment schedule that defines the time periods when the sender will provide funds and/or the amount of funds that the sender will provide to cover the plurality of money transfers. For example, the payments schedule may define that the sender will provide $100 every two weeks, $300 every other month, $25 per paycheck, etc., to cover the plurality of money transfers.

At block 1340, the money transfer provider evaluates the sender's performance in providing funds over the specified period of time to cover the plurality of money transfers. For example, the money transfer provider may evaluate whether the sender is late in providing any of the funds, how close to the schedule money transfer date the funds are provided, whether any of the money transfers were insufficiently funded, what was the source of funds (e.g., job, credit card, etc.), how big the sender's money transfer obligation is and how well they have met the obligation, etc. Further, the payment schedule that defines when the sender is to provide funds and/or the amount of funds that are to be provided may be compared against the sender's actual funding performance. The sender's performance in paying one or more bills via the money transfer provider may also be evaluated.

At blocks 1345 and 1350, the money transfer provider may determine a transfer credit indicator and assign the transfer credit indicator based on the evaluation. The transfer credit indicator may be any type of indicator such as any or a combination of numbers, letters, status levels (e.g., gold member, platinum member, etc.), loyalty card upgrades, etc. With the credit indicator, the system can have the ability to seize portions of any remitted funds by the money transfer network to replenish extended credit or as a precautionary measure if the indicator is very low. At block 1355, the money transfer provider may optionally provide credit to the sender based on the transfer credit indicator. Additionally or alternatively, the money transfer provider may extend an invitation to register in the value-advance money transfer program as previously described based on the transfer credit indicator. The money transfer provider may also share the transfer credit indicator with other entities, such as banking entities, so that those entities may extend credit and/or offer goods or services to the sender based on the transfer credit indicator. In this manner, unbanked consumers who regularly perform money transfers, and who otherwise may have a difficult time obtaining and building credit, can attain a credit indicator based on their money transfer performances. Likewise, entities that desire to extend credit (e.g., credit card companies, etc.) may use the money transfer provider's transfer credit indicator to develop financial confidence in a consumer and thereby extend credit to the consumer. In essence, the transfer credit indicator may be a measure of the money transfer provider's trust or confidence in a consumer that may be shared with other entities to facilitate the other entities in developing trust or confidence in the consumer based on the money transfer provider's trust or confidence.

Figure 14:
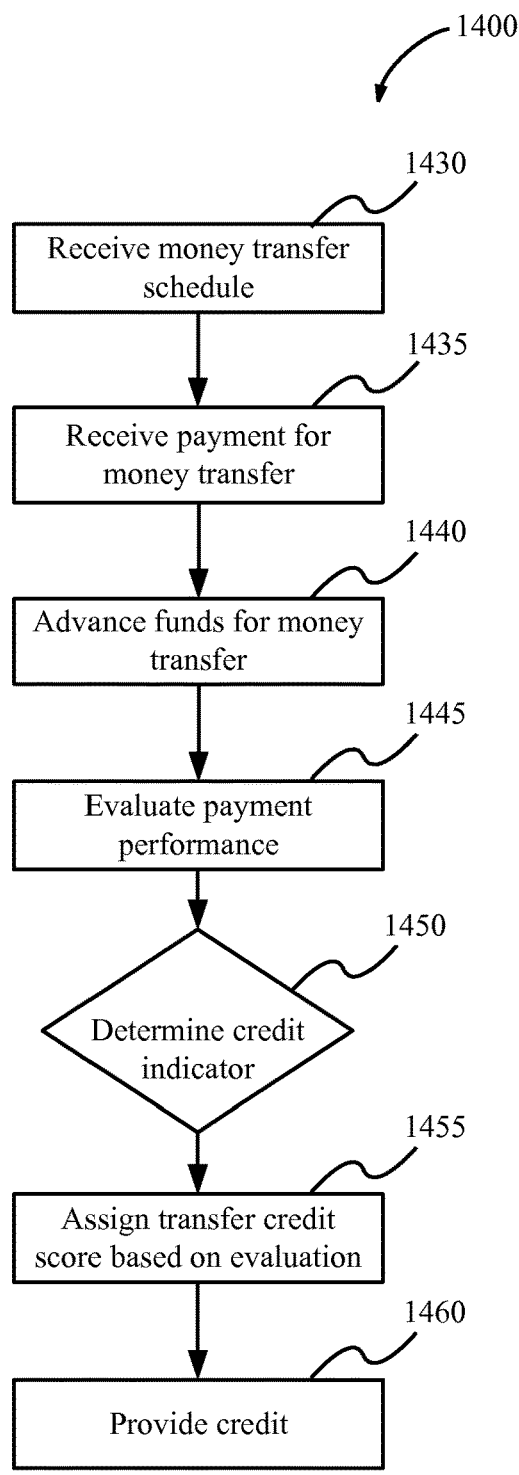
FIG. 14 illustrates another process for providing a credit indicator based on a money transfer pattern according to an embodiment of the present invention.

FIG. 14 illustrates another process 1400 for providing a credit indicator based on a money transfer pattern or performance. The process 1400 is similar to process 1300 except that process 1400 may also evaluate the sender's performance in repaying any advanced funds. The process 1400 may optionally begin at block 1430 with the money transfer provider receiving a money transfer schedule from the sender as previously described. At block 1435, the money transfer provider receives one or more payments over a specified period of time to cover one or more money transfers over that period of time. At block 1440, the money transfer provider advances funds to an account associated with the sender to fund one or more money transfers. In some embodiments, the need to advance funds may be predetermined based on the money transfer schedule. For example, the money transfer schedule may define that $1,000 is to be transferred to receiver A over the next 6 months of which the sender is to provide $800, leaving a remainder of $200 to be advanced by the money transfer provider. In other embodiments, the need to advance funds may be determined at the time the money transfer is to be executed such as when any money transfer is insufficiently funded or the sender may request that funds be advanced to cover one or more money transfers.

At block 1445, the sender's performance in repaying the advanced funds and/or in providing funds for the one or more money transfers is evaluated. For example, evaluating the sender's repayment of the advanced funds may include any one or a combination of evaluating whether the sender pays a monthly bill for the advanced funds, how quickly the advanced funds are repaid when a portion or percentage of future money transfers is withheld, how quickly the advanced funds are repaid when repayment is based on a portion or percentage of funds of money transfers in which the sender acts as a receiver, the repayment of interest corresponding to the advanced funds, etc. Further, the repayment of the advanced funds may be defined in the money transfer schedule, which may be used in the evaluation process to compare against the sender's actual performance. Evaluating the sender's performance in providing funds for the one or more money transfer may be done as previously described in FIG. 13.

At blocks 1450 and 1455, the money transfer provider may determine a transfer credit indicator and assign the transfer credit indicator based on the evaluation. The transfer credit indicator may be any type of indicator such as one or more or a combination of numbers, letters, status levels (e.g., gold member, platinum member, etc.), loyalty card upgrades, etc. At block 1460, the money transfer provider may optionally provide credit to the sender based on the transfer credit indicator. Additionally or alternatively, the money transfer provider may extend an invitation to register in the value-advance money transfer program and/or provide the transfer credit indicator to other entities as previously described.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method comprising:
   registering a sender account associated with a security program;
   receiving a request to conduct an electronic transfer, the request being associated with the sender account and the security program;
   receiving a digital identifier associated with the sender account;
   querying, based at least on the digital identifier, a rules database to identify one or more receiver accounts associated with the sender account, wherein the one or more receiver accounts are authorized to receive an electronic transfer from the sender account;
   determining, based on the request to conduct the electronic transfer that the sender account has insufficient resources to facilitate the electronic transfer;
   causing funds resources associated with a first system to be made available to cover at least a portion of the electronic transfer
   receiving a receiver identifier associated with the security program;
   comparing the receiver identifier to the identified one or more receiver accounts to determine that the receiver identifier is associated with the identified one or more receiver accounts; and
   executing, via the security program, the electronic transfer to an account associated with the receiver identifier.

2. The method of claim 1, wherein the method further comprises:
   determining that the sender account is eligible to receive the resources based at least in part on an evaluation of a request from the sender account and a history of electronic transfers associated with the security program.

3. The method of claim 2, wherein the method further comprises:
   receiving, by the first system, a fee associated with the sender account;
   receiving, by the first system, a credit score associated with the sender account; and
   receiving, by the first system, a loyalty member status associated with the sender account.

4. The method of claim 1, wherein the method further comprises:
   receiving, from the rules database, one or more rules that limit an amount of resources that are made available to the sender account.

5. The method of claim 4, wherein the one or more rules comprise:
   a rule limiting an amount of a single advance; and/or
   a rule limiting a total amount of multiple advances.

6. The method of claim 4, wherein the one or more rules comprises:
   a rule limiting eligible receiver accounts.

7. The method of claim 1, wherein the electronic transfer is an electronic money transfer.

8. The method of claim 1, wherein executing the electronic transfer comprises:
   causing funds to be transferred from the first system to control of the account associated with receiver identifier; and
   causing funds to be transferred from the sender account to the first system.

9. The method of claim 1, wherein executing the electronic transfer comprises:
   causing funds to be transferred from the sender account to control of the account associated with the receiver identifier.

10. The method of claim 1, wherein the account associated with the receiver identifier is money transfer has a destination that is selected from a group consisting of:
    a bank account;
    a credit card account;
    a prepaid account
    a check;
    cash;
    air miles; and
    a gift certificate.

11. The method of claim 1, wherein the method further comprises:
    determining one or more rules that limit a manner in which funds from the sender account are received to repay the electronic transfer conducted via the resources associated with the first system;
    receiving funds to repay the electronic transfer; and
    determining whether the funds to repay the electronic transfer comply with the one or more rules.

12. A non-transitory machine readable medium having instructions stored thereon, the instructions executable by one or more processors for at least:
    registering a sender account associated with a security program;
    receiving a request to conduct an electronic transfer, the request being associated with the sender account and the security program;
    receiving a digital identifier associated with the sender account;
    querying, based at least on the digital identifier, a rules database to identify one or more receiver accounts associated with the sender account, wherein the one or more receiver accounts are authorized to receive an electronic transfer from the sender account;
    determining, based on the request to conduct the electronic transfer, that the sender account has insufficient resources to facilitate the electronic transfer;

causing resources associated with a first system to be made available to cover at least a portion of the electronic receiving a receiver identifier associated with the security program;

comparing the receiver identifier to the identified one or more receiver accounts to determine that the receiver identifier is associated with the identified one or more receiver accounts; and executing, via the security program, the electronic transfer to an account associated with the receiver identifier.

13. The non-transitory machine readable medium of claim 12, wherein the instructions are further executable for at least:

determining that the sender account is eligible to receive the resources based at least in part on an evaluation of a request from the sender account and a history of electronic transfers associated with the security program.

14. The non-transitory machine readable medium of claim 12, wherein the instructions are further executable for at least:

receiving, from the rules database, one or more rules that limit an amount of resources that are made available to the sender account.

15. The non-transitory machine readable medium of claim 12, wherein the electronic transfer is an electronic money transfer.

16. The non-transitory machine readable medium of claim 12, wherein executing the electronic transfer comprises:

causing funds to be transferred from the sender account to control of the account associated with the receiver identifier.

17. A system comprising:

one or more processors; and a memory coupled with the one or more processors, the memory configured to store instructions that, when executed by the one or more processors, cause the one or more processors to:

register a sender account associated with a security program;

receive a request to conduct an electronic transfer, the request being associated with the sender account and the security program;

receive a digital identifier associated with the sender account;

query, based at least on the digital identifier, a rules database to identify one or more receiver accounts associated with the sender account, wherein the one or more receiver accounts are authorized to receive an electronic transfer from the sender account;

determine, based on the request to conduct the electronic transfer, that the sender account has insufficient resources to facilitate the electronic transfer;

cause resources associated with a first system to be made available to cover at least a portion of the electronic transfer receive a receiver identifier associated with the security program;

compare the receiver identifier to the identified one or more receiver accounts to determine that the receiver identifier is associated with the identified one or more receiver accounts; and execute, via the security program, electronic transfer to an account associated with the receiver identifier.

18. The system of claim 17, wherein the instructions that when executed by the one or more processors further cause the one or more processors to:

determine that the sender account is eligible to receive the resources based at least in part on an evaluation of a request from the sender account and a history of electronic transfers associated with the security program.

19. The system of claim 17, wherein the instructions that when executed by the one or more processors further cause the one or more processors to:

receive, from the rules database, one or more rules that limit an amount of resources that are made available to the sender account.

20. The system of claim 17, wherein the electronic transfer is an electronic money transfer.

21. The system of claim 17, wherein the instructions that when executed by the one or more processors further cause the one or more processors to:

cause funds to be transferred from the sender account to control of account associated with the receiver identifier.

* * * * *

UNITED STATES PATENT AND TRADEMARK OFFICE
CERTIFICATE OF CORRECTION

PATENT NO. : 10,535,098 B2  
APPLICATION NO. : 14/188100  
DATED : January 14, 2020  
INVENTOR(S) : Kurt Bulawa et al.

Page 1 of 1

It is certified that error appears in the above-identified patent and that said Letters Patent is hereby corrected as shown below:

In the Claims

Column 23, Claim 1, Line 46, please delete the word "funds"

Column 26, Claim 17, Line 20, please insert the word -- the -- before the word 'electronic'

Signed and Sealed this  
Fifteenth Day of September, 2020

Andrei Iancu  
*Director of the United States Patent and Trademark Office*